US009930530B2

(12) United States Patent
Patil et al.

(10) Patent No.: US 9,930,530 B2
(45) Date of Patent: Mar. 27, 2018

(54) METHODS AND APPARATUSES FACILITATING SYNCHRONIZATION OF SECURITY CONFIGURATIONS

(71) Applicant: QUALCOMM Incorporated, San Diego, CA (US)

(72) Inventors: Kiran KishanRao Patil, Hyderabad (IN); Suresh Sanka, Hyderabad (IN); Liangchi Hsu, San Diego, CA (US); Aziz Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/970,211

(22) Filed: Dec. 15, 2015

(65) Prior Publication Data

US 2016/0105800 A1   Apr. 14, 2016

Related U.S. Application Data

(63) Continuation of application No. 13/162,313, filed on Jun. 16, 2011, now abandoned.

(Continued)

(51) Int. Cl.
*H04W 12/08* (2009.01)
*H04L 29/06* (2006.01)
(Continued)

(52) U.S. Cl.
CPC ............ *H04W 12/08* (2013.01); *H04L 63/20* (2013.01); *H04W 12/02* (2013.01); *H04W 12/10* (2013.01); *H04W 48/16* (2013.01)

(58) Field of Classification Search
CPC .................................................. H04W 12/08
See application file for complete search history.

(56) References Cited

U.S. PATENT DOCUMENTS

| 7,020,455 B2 | 3/2006 | Krishnarajah et al. |
| 2003/0100291 A1 | 5/2003 | Krishnarajah et al. |

(Continued)

FOREIGN PATENT DOCUMENTS

| CN | 101416469 A | 4/2009 |
| EA | 013147 B1 | 2/2010 |

(Continued)

OTHER PUBLICATIONS

3GPP TS 25.331 V10.3.1, "3rd Generation Partnership Project; Technical Specification Group Radio Access Network; Radio Resource Control (RRC); Protocol Specification (Release 10)" (Apr. 2011).

(Continued)

*Primary Examiner* — Mazda Sabouri
(74) *Attorney, Agent, or Firm* — Loza & Loza LLP

(57) ABSTRACT

Methods and apparatuses are provided for synchronizing security parameters between access terminals and a wireless network. An access terminal and network entity can conduct a security mode procedure where the access terminal sends a security mode complete message to the network entity. On receipt of the security mode complete message, the network entity may update to new security parameters. The access terminal may initiate a mobility procedure while the security mode procedure is ongoing and may, as a result, abort the security mode procedure and revert back to the old security parameters. The access terminal can send a mobility update message to the network entity including a dedicated status indicator adapted to inform the network entity that the access terminal has reverted back to the old security parameters. In response to the mobility update message, the network entity may revert back to the old security parameters.

26 Claims, 17 Drawing Sheets

Related U.S. Application Data

(60) Provisional application No. 61/356,464, filed on Jun. 18, 2010.

(51) Int. Cl.
  *H04W 12/02* (2009.01)
  *H04W 12/10* (2009.01)
  *H04W 48/16* (2009.01)

(56) References Cited

U.S. PATENT DOCUMENTS

| | | |
|---|---|---|
| 2004/0162055 A1 | 8/2004 | Wu |
| 2007/0263871 A1 | 11/2007 | Maheshwari et al. |
| 2008/0240439 A1 | 10/2008 | Mukherjee et al. |
| 2008/0285494 A1 | 11/2008 | Shin |
| 2009/0154408 A1 | 6/2009 | Jeong et al. |
| 2010/0067454 A1 | 3/2010 | Lee et al. |
| 2010/0067697 A1 | 3/2010 | Casati et al. |
| 2010/0115275 A1 | 5/2010 | Suh et al. |
| 2010/0197230 A1* | 8/2010 | Charles ............... H04L 1/1848 455/63.1 |
| 2011/0312299 A1 | 12/2011 | Patil et al. |
| 2012/0275340 A1 | 11/2012 | McGann |

FOREIGN PATENT DOCUMENTS

| | | |
|---|---|---|
| EP | 1451963 B1 | 7/2006 |
| JP | 2008289116 A | 11/2008 |
| JP | 2010011244 A | 1/2010 |
| WO | WO-2007127972 | 11/2007 |

OTHER PUBLICATIONS

3GPP TS 44.118: "3rd Generation Partnership Project; Technical Specification Group GSM/EDGE Radio Access Network; Mobile radio interface layer 3 specification; Radio Resource Control (RRC) protocol; Iu Mode V10.0.0 (Release 10)", Mar. 2011, Retrieved from the Internet: http://www.3gpp.org/ftp/Specs/archive/44_series/44.118/44118-a00.zip.

3rd Generation Partnership Project; Technical Specification Group Services and System Aspects; 3GPP System Architecture Evolution (SAE): Security Architecture; (Release 8), 3GPP Standard; 3GPP TS 33.401, 3rd Generation Partnership Project (3GPP), Mobile Competence Centre; 650, Route Des Lucioles; F-06921 Sophia-Antipolis Cedex; France, No. V8.2.1, Dec. 1, 2008 (Dec. 1, 2008), pp. 1-58, XP050376844.

Ericsson: "As key change on the fly (after AKA)", 36PP Draft; S3-080056_ERI_Key_Change_on_theFly, 3rd Generation Partnership Project (3GPP), Mobile Competence Centre; 650, Route Des Lucioles; F-06921 Sophia-Antipolis Cedex; France, vol. SA WG3, no. Sanya; Feb. 18, 2008, Feb. 18, 2008 (Feb. 18, 2008), XP050280380, [retrieved on Feb. 18, 2008].

International Search Report and Written Opinion—PCT/US2011/040964—ISA/EPO—dated Nov. 10, 2011.

Qualcomm Europe: "As re-keying in case of inter-cell handover", 3GPP Draft; R2-090065, 3rd Generation Partnership Project (3GPP), Mobile Competence Centre; 650, Route Des Lucioles; F-06921 Sophia-Antipolis Cedex; France, no. Ljubljana; Jan. 6, 2009, Jan. 6, 2009 (Jan. 6, 2009), XP050322113, [retrieved on Jan. 6, 2009].

Qualcomm Europe, "Error handling on common channels, redux" [online], 3GPP TSG-RAN WG2#64bis, R2-090114, Jan. 12-15, 2009, <URL:http://www.3gpp.org/ftp/tsg_ran/WG2_RL2/TSGR2_64bis/Docs/R2-090114.zip>, Jan. 6, 2009, pp. 1-4.

Taiwan Search Report—TW100121247—TIPO—dated Apr. 10, 2014.

TSG-RAN WG2, 25.331CRs (Rel-5 & Rel-6) on handling of keys at inter-RAT handover, TGS-RAN Meeting #28 Quebec, Canada, Jun. 1-3, 2005.

\* cited by examiner

METHODS AND APPARATUSES FACILITATING SYNCHRONIZATION OF SECURITY CONFIGURATIONS

CROSS REFERENCE TO RELATED APPLICATIONS

This is a continuation application of application Ser. No. 13/162,313 entitled "Methods and Apparatuses Facilitating Synchronization of Security Configurations" filed Jun. 16, 2011, which claims priority to U.S. Provisional Application No. 61/356,464 entitled "Methods and Apparatuses Facilitating Synchronization of Security Configurations" filed Jun. 18, 2010, which are assigned to the assignee hereof and hereby expressly incorporated by reference herein.

BACKGROUND

Field

Various features relate to wireless communication devices and systems, and more particularly to synchronizing security configurations between access terminals and network entities.

Background

Security is an important feature of a wireless communication system. Security in some wireless communication systems may conventionally comprise two features: the "Data Integrity" and "Ciphering". "Data Integrity" is the feature that ensures no rogue network will be able to send unnecessary signaling messages with the intent to cause, or actually causing any undesired effect in an ongoing call. "Ciphering" is the feature that ensures all signaling and data messages are ciphered over the air interface to inhibit a third party from eavesdrop on the messages. In some wireless communication systems, such as a Universal Mobile Telecommunications System (UMTS), integrity protection is mandatory while ciphering is optional. Integrity protection may be implemented only on signaling radio bearers, whereas ciphering may be implemented on signaling as well as data radio bearers.

In a conventional wireless network, an access terminal (AT) typically negotiates with the wireless network to establish security parameters, such as encryption keys for use in encrypting (or ciphering) communications between the access terminal and the network components. Such security parameters may be updated and/or changed occasionally to ensure secrecy of the data transmitted between the access terminal and the network components.

An example of a conventional method for initiating or updating security parameters between the access terminal and the wireless network generally includes the access terminal receiving a security mode command from the wireless network and updating its security parameters based on the received security mode command. After the access terminal updates its security parameters, and prior to implementing the new security parameters, the access terminal sends a security mode complete message to the wireless network. On receipt of the security mode complete message, the wireless network will begin using the new security parameters to protect any subsequent downlink messages sent to the access terminal.

However, the access terminal will not begin using the new security parameters to protect any uplink messages sent to the wireless network until an acknowledgement message is received from the wireless network in response to the security mode complete message sent by the access terminal. In other words, the access terminal does not begin using the new security parameters for messages sent from the access terminal to the wireless network until the access terminal receives an acknowledgement from the wireless network that the security mode complete message was received and authenticated.

As a result, there exists a small window between the time when the security mode procedure is completed at the wireless network (e.g., when the security mode complete message is received at the wireless network) and when the security mode procedure is completed at the access terminal (e.g., when the acknowledgement is received by the access terminal and the security parameters are updated). Because of this time window, it is possible for the wireless network to be updated to the new security parameters, while the access terminal remains with the old security parameters. For example, conventional access terminals are typically adapted to abort the security mode procedure when certain other procedures are initiated, such as a mobility procedure.

In instances where the wireless network is updated to the new security parameters, but the access terminal continues with the old security parameters, the wireless connection between the two typically fails, resulting in dropped calls and dissatisfaction by the user of the access terminal. Therefore, it would be beneficial to provide methods and apparatuses for avoiding the situation where the wireless network is updated to new security parameters while the access terminal continues with old security parameters and/or for synchronizing the security parameters when such a situation occurs.

SUMMARY

Various features facilitate synchronization of security parameters between access terminals and an access network. One feature provides access terminals adapted to facilitate such synchronization. According to one or more embodiments, an access terminal (AT) may comprise a wireless communications interface coupled with a processing circuit. The wireless communications interface may be adapted to facilitate wireless communications of the access terminal.

According to at least one implementation, the processing circuit may be adapted to conduct a security mode procedure for reconfiguring security parameters of the access terminal. While the security mode procedure is ongoing, the processing circuit may initiate a mobility procedure. The processing circuit may also abort the security mode procedure and revert back to old security parameters as a result of initiating the mobility procedure. A mobility update message may be sent by the processing circuit via the wireless communications interface, where the mobility update message includes a dedicated security status indicator adapted to indicate that the access terminal has reverted back to the old security parameters.

According to at least one other implementation, the processing circuit may be adapted to conduct a security mode procedure for reconfiguring security parameters of the access terminal. While the security mode procedure is ongoing, the processing circuit may initiate a mobility procedure, including sending a mobility update message. The processing circuit may also abort the security mode procedure and revert back to old security parameters as a result of initiating the mobility procedure. The processing circuit may receive a mobility update confirmation message in response to a mobility update message via the wireless communication interface. If unable to decode the mobility update confirmation message using the old security parameters, the processing circuit may switch to the new security parameters.

According to at least one other implementation, the processing circuit may be adapted to conduct a security mode procedure including sending a security mode complete message to an access network via the wireless communication interface. In response to the security mode complete message, the processing circuit may receive an acknowledgement message via the wireless communication interface. The processing circuit can update to new security parameters, and send another acknowledgement message to the access network via the wireless communication interface, where the other acknowledgement message is adapted to indicate that the access terminal has updated to the new security parameters.

Methods operational in an access terminal are also provided according to a feature for facilitating synchronization of security parameters between access terminals and an access network. In at least one implementation of such methods, a security mode procedure may be conducted for reconfiguring security parameters of the access terminal. A mobility procedure may be initiated while the security mode procedure is ongoing. The security mode procedure may be aborted as a result of initiating the mobility update procedure and the access terminal may be reverted back to the old security parameters. A mobility update message may be sent, where the mobility update message includes a dedicated status indicator adapted to indicate that the access terminal has reverted back to the old security parameters.

In at least one other implementation, a security mode procedure may be conducted for reconfiguring security parameters of the access terminal. A mobility procedure may be initiated while the security mode procedure is ongoing, including sending a mobility update message. The security mode procedure may be aborted as a result of initiating the mobility update procedure and the access terminal may be reverted back to the old security parameters. A mobility update confirmation message may be received in response to the mobility update message. The access terminal may be switched to the new security parameters if the access terminal is unable to decode the mobility update confirmation message using the old security parameters.

In yet one or more other implementations, such methods may include conducting a security mode procedure including sending a security mode complete message to an access network. In response to the security mode complete message, receiving an acknowledgement message. The access terminal may be updated to new security parameters. Another acknowledgement message may be sent to the access network, where the other acknowledgement message is adapted to indicate that the access terminal has updated to the new security parameters.

Another feature provides network entities adapted to facilitate synchronization of security parameters between access terminals and an access network. Such network entities may comprise a communications interface coupled with a processing circuit. In at least one implementation, the processing circuit may be adapted to receive a security mode complete message from an access terminal via the communications interface. In response to the security mode complete message, the processing circuit may update to new security parameters. The processing circuit may further receive a mobility update message from the access terminal via the communications interface. The mobility update message may include a dedicated security status indicator adapted to indicate that the access terminal has reverted back to old security parameters. In response to the received mobility update message, the processing circuit may revert back to the old security parameters.

In at least one other implementation, the processing circuit may be adapted to receive a security mode complete message from an access terminal via the communications interface. In response to the security mode complete message, the processing circuit may update to new security parameters. The processing circuit may receive a mobility update message from the access terminal, and may send a mobility update confirmation message to the access terminal in response to the mobility update message. If a response to the mobility update confirmation message is not received from the access terminal, the processing circuit may revert back to the old security parameters and may resend the mobility update confirmation message to the access terminal using the old security parameters to cipher the message.

In yet one or more other implementations, the processing circuit may be adapted to receive a security mode complete message from an access terminal via the communications interface. The processing circuit may send an acknowledgement message in response to the security mode complete message. The processing circuit may receive another acknowledgement message from the access terminal indicating that the access terminal has updated to the new security parameters. In response to the other acknowledgement message, the processing circuit may update to the new security parameters.

Method operations in a network entity are also provided according to a feature for facilitating synchronization of security parameters between access terminals and an access network. In at least one implementation of such methods, a security mode complete message may be received from an access terminal. In response to the security mode complete message, the network entity may be updated to new security parameters. A mobility update message may be received from the access terminal, where the mobility update message includes a dedicated security status indicator adapted to indicate that the access terminal has reverted back to old security parameters. In response to the mobility update message, the network entity may be reverted back to the old security parameters.

In at least one other implementation of such methods, a security mode complete message may be received from an access terminal. In response to the security mode complete message, the network entity may be updated to new security parameters. A mobility update message may be received from the access terminal, and a mobility update confirmation message may be sent to the access terminal in response to the received mobility update message. If a response to the mobility update confirmation message is not received from the access terminal, the network entity may be reverted back to the old security parameters and the mobility update confirmation message may be resent to the access terminal using the old security parameters to cipher the mobility update confirmation message.

In yet one or more other implementations of such methods, security mode complete message may be received from an access terminal. An acknowledgement message may be sent in response to the security mode complete message. Another acknowledgement message may be received from the access terminal indicating that the access terminal has updated to the new security parameters. In response to the other acknowledgement message, the network entity may be updated to the new security parameters.

DETAILED DESCRIPTION

Figure 1:
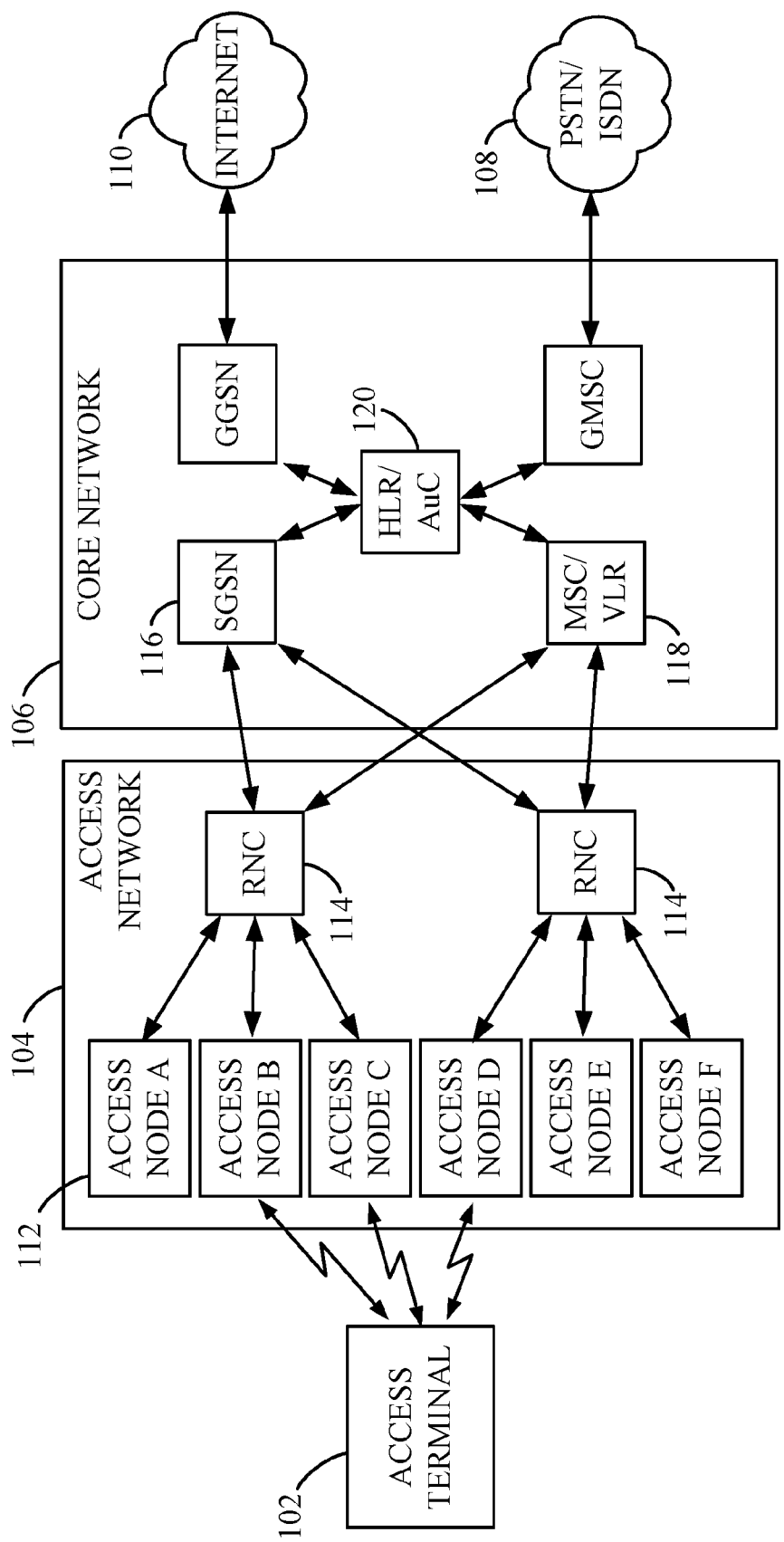
FIG. 1 is a block diagram illustrating a network environment in which various features may be utilized according to at least one example.

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The term "access terminal" as used herein is meant to be interpreted broadly. For example, an "access terminal" may include user equipment and/or subscriber devices, such as mobile phones, pagers, wireless modems, personal digital assistants, personal information managers (PIMs), personal media players, palmtop computers, laptop computers, and/or other mobile communication/computing devices which communicate, at least partially, through a wireless or cellular network.

Overview

One or more features facilitate and/or resolve synchronization of security parameters between an access terminal and one or more entities of a wireless network. According to a feature, an access terminal (AT) may indicate to a network entity that the access terminal has reverted back to old security parameters. For example, the access terminal may send an indicator with a mobility update message to inform the network entity of the reversion. In another example, the access terminal may send a message to the network entity to inform the network entity that the access terminal has successfully updated to the new security parameters.

According to a feature, an access terminal may determine that a network entity has updated to the new security parameters and may accordingly update its own security parameters. For example, after aborting a security mode procedure for updating to new security parameters, the access terminal may determine that it is unable to decode a message received from the network entity. In response to the failure to decode, the access terminal may update to the new security parameters and attempt to decode the received message using the new security parameters. If the access terminal is successful in decoding the received message with the new security parameters, the access terminal can continue using the new security parameters.

According to a feature, a network entity may determine that an access terminal has reverted back to old security parameters and may accordingly revert its own security parameters. For example, after updating to new security parameters, the network entity may send a message to the access terminal that is ciphered according to the new security parameters. If the network entity fails to receive a response to the sent message, the network entity may revert back to the old security parameters and send the message using the old security parameters to cipher the message. If the network entity receives a response to the sent message using the old security parameters, the network entity can continue using the old security parameters.

Exemplary Network Environment

FIG. 1 is a block diagram illustrating a network environment in which various features may be utilized according to at least one example. An access terminal 102 may be adapted to wirelessly communicate with an access network 104, which is communicatively coupled to a core network 106.

Generally speaking, the access network 104 includes radio equipment adapted to enable access terminals 102 to access the network, while the core network 106 includes switching and routing capabilities for connecting to either a circuit-switched network (e.g., Public Switched Telephone Network (PTSN)/Integrated Services Digital Network (ISDN) 108) or to a packet-switched network (e.g., internet 110). The core network 106 further facilitates mobility and subscriber location management and authentication services. In some example, like that illustrated in FIG. 1, the core network 106 may be a Universal Mobile Telecommunications System (UMTS)-compatible network or a Global System for Mobile communication (GSM)-compatible network.

The access network 104 may include one or more access nodes 112 (e.g., base station, node B, etc.) and a radio network controller (RNC) 114. Each access node 112 is typically associated with a cell, or sector, comprising a geographical area of reception and transmission coverage. Cells, or sectors, can overlap with each other. The radio network controller (RNC) 114 may be adapted to control the access nodes 112 that are communicatively connected to it. The radio network controller (RNC) 114 may further be adapted to carry out radio resource management, some of the mobility management functions, and may be the point where encryption is performed before user data is sent to and from the access terminal 102. The radio network controller (RNC) 114 is communicatively coupled to the core network 106 via a serving General Packet Radio Service (GPRS) support node (SGSN) 116 for packet-switched calls and via a mobile switching center (MSC) 118, which may include a visitor location register (VLR), for circuit-switched calls. A home location register (HLR) and an Authentication Center (AuC) 120 may serve to authenticate access terminals prior to providing communication services via the core network 106. Note that, in other types of networks, the functions of the HLR/AuC 120 and other components (like the MSC/VLR 118) may be performed by other equivalent network entities. For instance, in an Long Term Evolution (LTE) network, some or all of the functions of the HLR/AuC 120 may be performed by a home subscriber server (HSS). The core network 106 may also include a mobile management entity (MME) performs bearer activation/deactivation of access terminals, assists in authenticating access terminals, and/or perform access terminal tracking and/or paging procedures (including retransmissions) for the access terminals coupled to the core network.

When an access terminal 102 attempts to connect to the access network 104, the access terminal 102 is initially authenticated in order to verify the identity of the access terminal 102. The access terminal 102 also authenticates the network to verify that it is connected to an access network 104 that it is authorized to use. Negotiation typically ensues between the access terminal 102 and the access network 104 and/or core network 106 to establish security parameters, such as encryption keys for use in encrypting communications between the access terminal 102 and the network components (e.g., access network 104 and/or core network 106). Such security parameters may be updated and/or changed occasionally to ensure secrecy of the data transmitted between the access terminal 102 and the network components.

Figure 2:
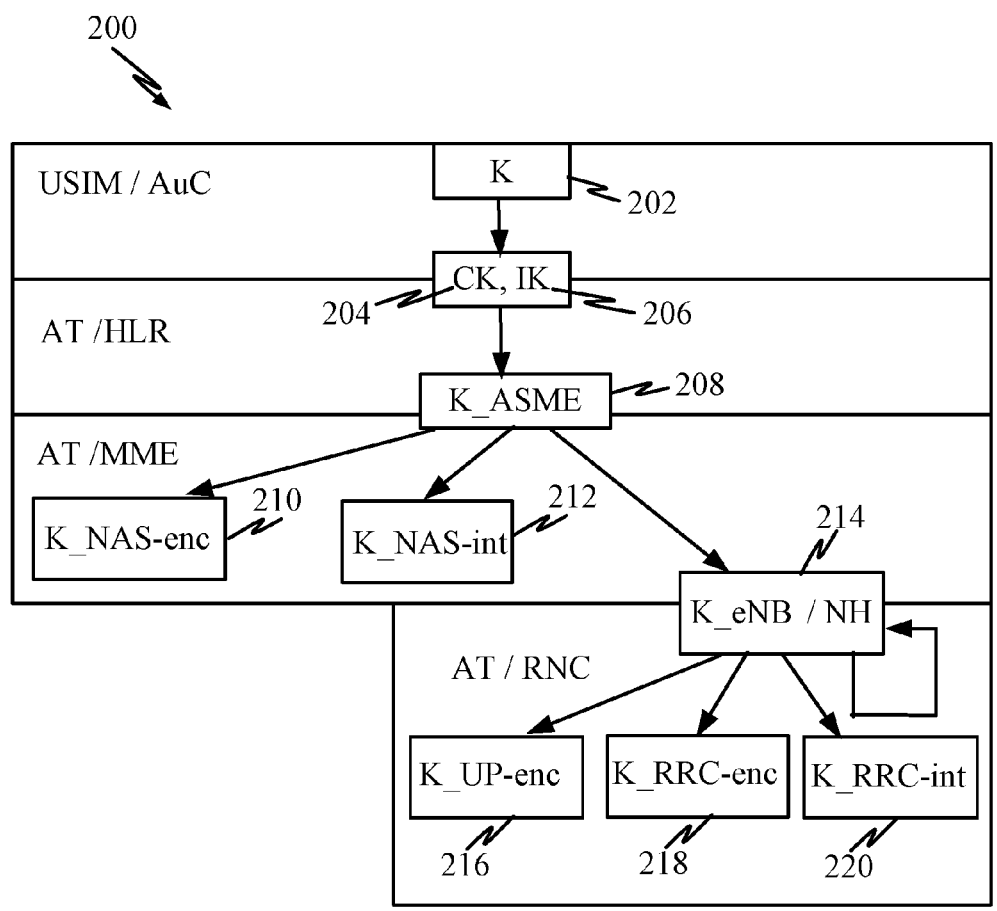
FIG. 2 illustrates a typical key hierarchy that may be implemented within a typical wireless communication network.

FIG. 2 illustrates a typical key hierarchy 200 that may be implemented to establish the security parameters (e.g., encryption keys) for use in encrypting communications between the access terminal 102 and the network components (e.g., access network 104 and/or core network 106).

Here, a Universal Subscriber Identity Module (USIM), in the access terminal 102, and the core network 106 (e.g., an Authentication Center (HLR/AuC 120 in FIG. 1)) use a master key K 202 to generate a cipher key (CK) 204 and integrity key (IK) 206. The cipher key (CK) 204 and integrity key (IK) 206 may then be used by the communication device and the core network 106 (e.g., a Home Location Register (HLR)) to generate an Access Security Management Entity key K_ASME 208. The security activation of an access terminal 102 may be accomplished through an Authentication and Key Agreement procedure (AKA), Non-Access Stratum (NAS) Security Mode Configuration (NAS SMC) procedure and Access Stratum (AS) Security mode Configuration (AS SMC) procedure. AKA is used to derive the key K_ASME 208, which is then used as a base key for the calculation of NAS (Non-Access Stratum) keys 210 and 212 and AS (Access Stratum) keys 214, 216, 218, and 220. The access terminal 102 and the core network 106 may then use the K_ASME 208 to generate one or more of these security keys.

Figure 3:
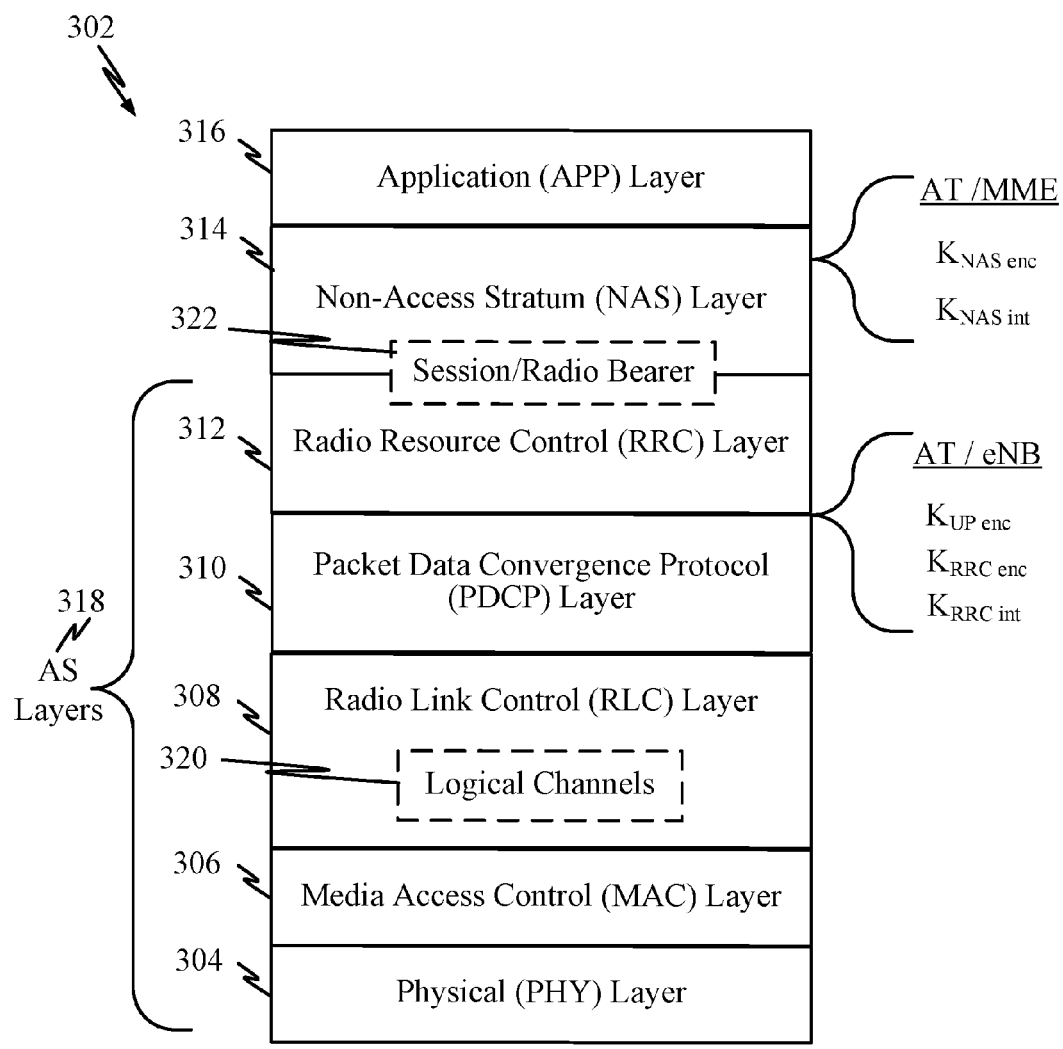
FIG. 3 illustrates an exemplary protocol stack that may be implemented in a communication device operating in a packet-switched network.

Packet-switched networks may be structured in multiple hierarchical protocol layers, where the lower protocol layers provide services to the upper layers and each layer is responsible for different tasks. For example, FIG. 3 illustrates an exemplary protocol stack that may be implemented in a communication device operating in a packet-switched network. In this example, the protocol stack 302 includes a Physical (PHY) Layer 304, a Media Access Control (MAC) Layer 306, a Radio Link Control (RLC) Layer 308, a Packet Data Convergence Protocol (PDCP) Layer 310, a Radio Resource Control (RRC) Layer 312, a Non-Access Stratum (NAS) Layer 314, and an Application (APP) Layer 316.

The layers below the NAS Layer 314 are often referred to as the Access Stratum (AS) Layer 318. The RLC Layer 308 may include one or more channels 320. The RRC Layer 312 may implement various monitoring modes for the access terminal, including connected state and idle state. The Non-Access Stratum (NAS) Layer 314 may maintain the communication device's mobility management context, packet data context and/or its IP addresses. Note that other layers may be present in the protocol stack 302 (e.g., above, below, and/or in between the illustrated layers), but have been omitted for the purpose of illustration.

Referring to FIGS. 1-3, radio/session bearers 322 may be established, for example at the RRC Layer 312 and/or NAS Layer 314. Consequently, the NAS Layer 314 may be used by an access terminal 102 and the core network 106 to generate the security keys K_NAS-enc 210 and K_NAS-int 212 shown in FIG. 2. Similarly, the RRC Layer 312 may be used by the access terminal 102 and the access network 104 (e.g., RNC 114) to generate the Access Stratum (AS) security keys K_UP-enc 216, K_RRC-enc 218, and K_RRC-int 220. While the security keys K_UP-enc 216, K_RRC-enc 218, and K_RRC-int 220 may be generated at the RRC Layer 312, these keys may be used by the PDCP Layer 310 to secure signalling and/or user/data communications. For instance, the key K_UP-enc 216 may be used by the PDCP Layer 310 to secure for user/data plane (UP) communications, while the keys K_RRC-enc 218, and K_RRC-int 220 may be used to secure signalling (i.e., control) communications at the PDCP Layer 310.

In the derivation of these security keys, used for ciphering and integrity algorithms, both at the AS (User plane and RRC) and NAS requires that an individual algorithm identity be provided as one of the inputs. At the AS level, the algorithms to be used are provided by a Radio Resource Control (RRC) Security Mode Command.

Figure 4:
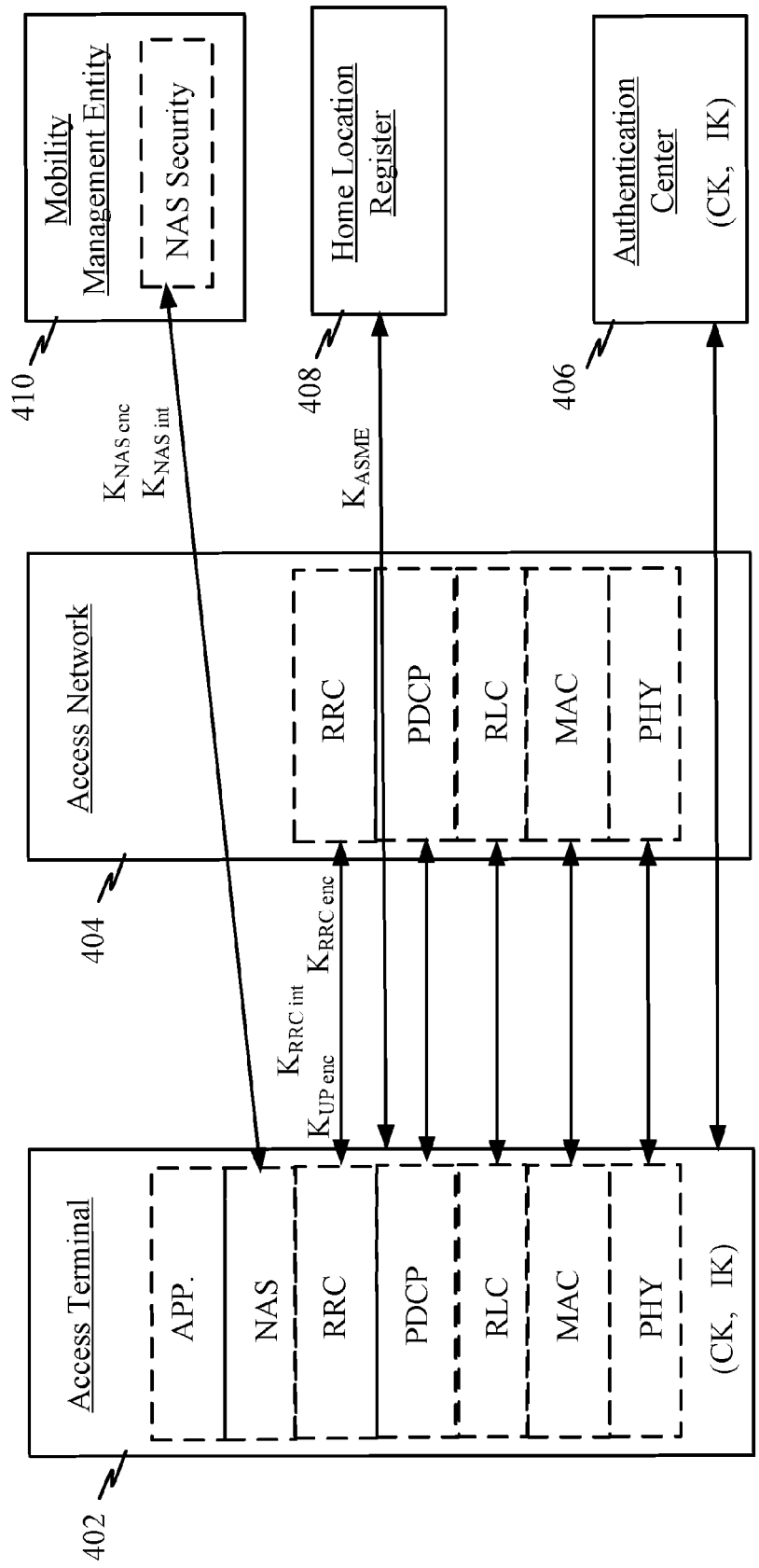
FIG. 4 is a block diagram illustrating a network system in which the various security keys illustrated in FIGS. 2 and 3 may be generated.

FIG. 4 is a block diagram illustrating a network system in which the various security keys illustrated in FIGS. 2 and 3 may be generated. Here, an access terminal 402 may implement a communication stack that includes various layers (e.g., APP, NAS, RRC, RLC, MAC, and PHY). An access network 404 may provide wireless connectivity to the access terminal 402 so that it may communicate with the network. An authentication center (AuC) 406 and the access terminal 402 may both know or have access to a root key (K) which can be used to generate or obtain a cipher key (CK) and/or an integrity key (IK). The access terminal 402 and/or a home location register (HLR) 408 may then use the cipher key (CK) and/or integrity key (IK) to generate an Access Security Management Entity key K_ASME. Using the K_ASME key, the access terminal 402 and a mobility management entity (MME) 410 may then generate the keys K_NAS-enc and K_NAS-int. The access terminal 402 and MME 410 may also generate an access network-specific key K_eNB/NH. Using this access network-specific key K_eNB/NH, the access terminal 402 and access network 404 may generate the keys K_UP-enc and K_RRC-enc and K_RRC-int.

Details about the derivation of these keys is provided in the 3GPP STD-T63-33.401 "System Architecture Evolution (SAE): Security Architecture" (known as 3GPP TS 33.401) Release 8, which is incorporated herein by reference.

Referring again to FIG. 1, the access terminal 102 is typically adapted to change between cells (e.g., access nodes 112) to which it is actively connected. For example, as an access terminal 102 travels through a geographic area, different cells (e.g., access nodes 112) may provide better connectivity (e.g., stronger signal). The access terminal 102 may accordingly switch from one cell (e.g., access node 112) to another cell (e.g., access node 112). In conventional networks, such mobility of an access terminal 102 requiring changes from one cell (e.g., access node 112) to another cell (e.g., access node 112) may result in cancellation of any ongoing update of security parameters (e.g., update to Access Stratum security parameters K_UP-enc, K_RRC-enc and/or K_RRC-int). For example, as a result of mobility of the access terminal 102, a mobility procedure may be initiated, resulting in a cancellation of an ongoing security mode procedure. By way of example and not limitation, a mobility procedure may include a cell reselection, Radio Link Control (RLC) unrecoverable error, out of service issue, etc. Accordingly, some non-limiting examples of mobility update messages that may be sent as part of a mobility procedure can include a cell reselection message, a radio link control (RLC) unrecoverable error message, an out of service message, etc.

In cases where an ongoing security mode procedure is cancelled there is a possibility that the security parameters are updated at the access network 104, but not updated at the access terminal 102, as will be described in more detail below. As a result the security parameters being updated at the access network 104 but not at the access terminal 102, a permanent message/data decoding error and loss of connection between the access terminal 102 and the access network 104 can occur (e.g., resulting in dropped calls).

According to one feature, when the access terminal 102 initiates a mobility procedure (e.g., reselection of an access node 112) after the access network 104 has updated to new security parameters, the access terminal 102 may be adapted to send an indication to the access network 104 informing the access network 104 that the access terminal 102 has reverted back to the old security parameters. For example, the access terminal 102 may include an indication with the mobility update message sent to the access network 104.

According to another feature, the access network 104 may be adapted to switch back to the old security parameters when the access terminal 102 fails to respond to a mobility update confirmation message from the access network 104 that is encrypted according to the new security parameters. That is, after the access network 104 has sent a mobility update confirmation message to the access terminal 102 a specific number of times without receiving a response from the access terminal 102, the access network 104 may revert back to the old security parameters and send the mobility update confirmation message encrypted according to the old security parameters. If the access terminal 102 then responds to the mobility update confirmation message that is encrypted according to the old security parameters, then the access network 104 knows that the update of security parameters was not successful and the access network 104 continues using the old security parameters.

According to another feature, the access network 104 may be adapted to update the security parameters only after receiving an additional acknowledgement message from the access terminal 102. That is, after a mobility update confirmation message is sent from the access network 104 to the access terminal 102, the access network 104 may await another acknowledgement message from the access terminal 102 before the access network 104 updates the security parameters. In this manner, if the access terminal 102 has aborted the update of the security parameters, the access network 104 will not unknowingly update its security parameters prematurely.

According to yet another feature, the access terminal 102 may be adapted to identify its failure to decode a mobility update confirmation message from the access network 104 after it is sent a specific number of times. If the access terminal 102 is unable to decode the message after the specific number of times, the access terminal 102 may be adapted to switch to the new security parameters and attempt to decode the mobility update confirmation message using the new parameters. If the access terminal 102 is successful in decoding the mobility update confirmation message using the new parameters, then the access terminal 102 can continue from that point forward to use the new security parameters in communicating with the access network 104.

Figure 5A:
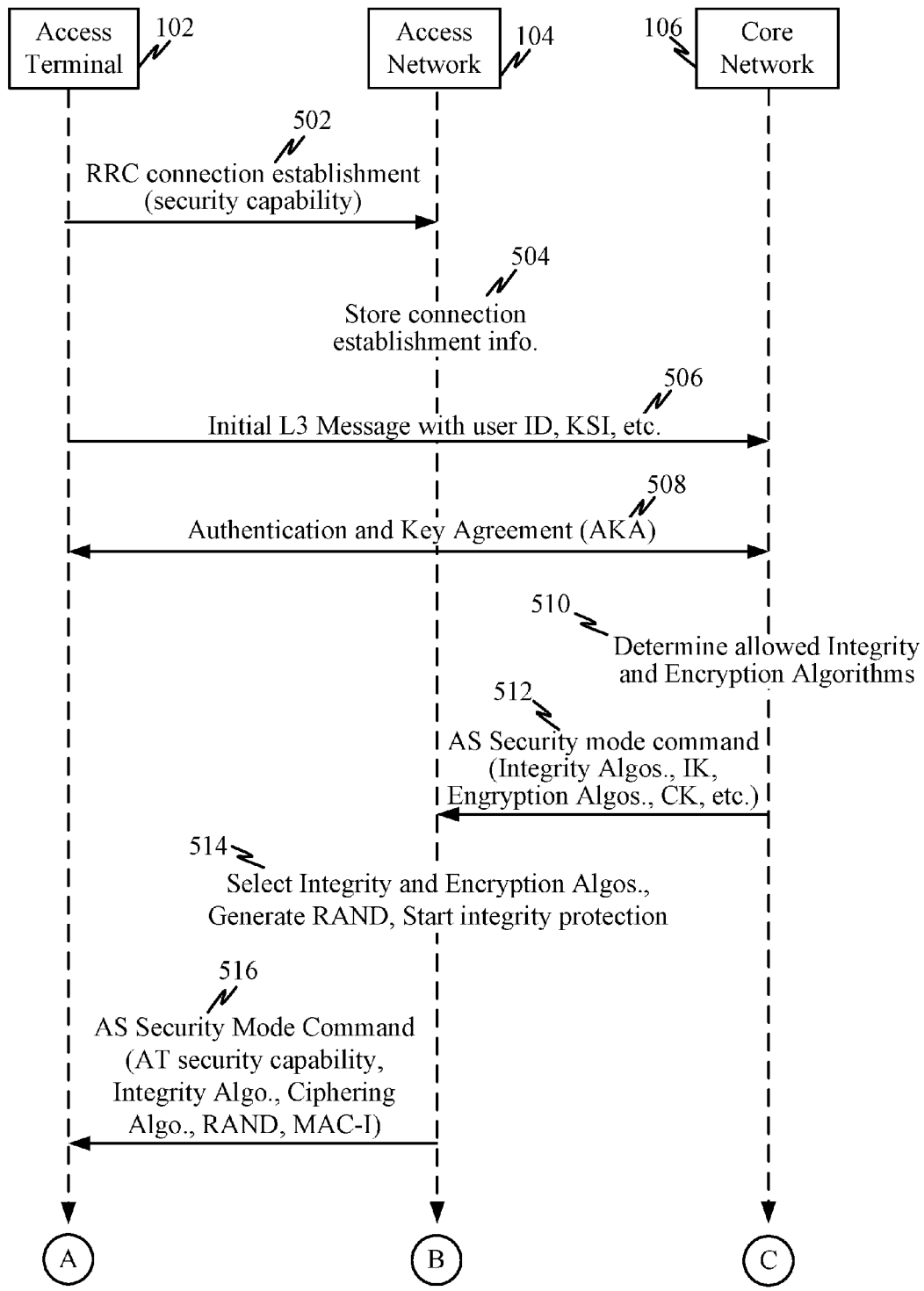
FIG. 5 (comprising FIGS. 5A and 5B) is a flow diagram illustrating an example of a security parameter synchronization operation in which an access terminal indicates to the access network that the security mode procedure was aborted at the access terminal.
Figure 5B:
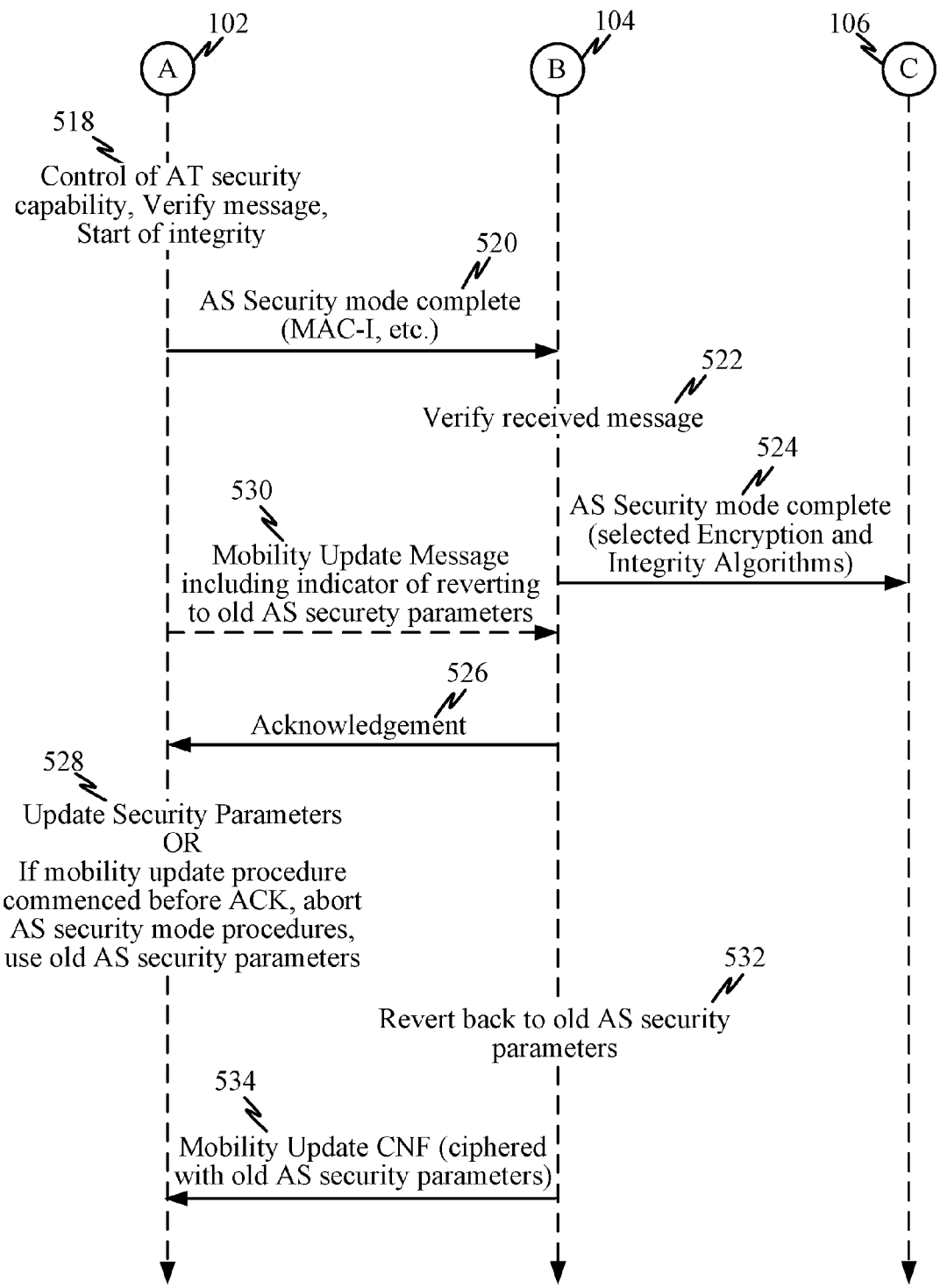
Figure 6:
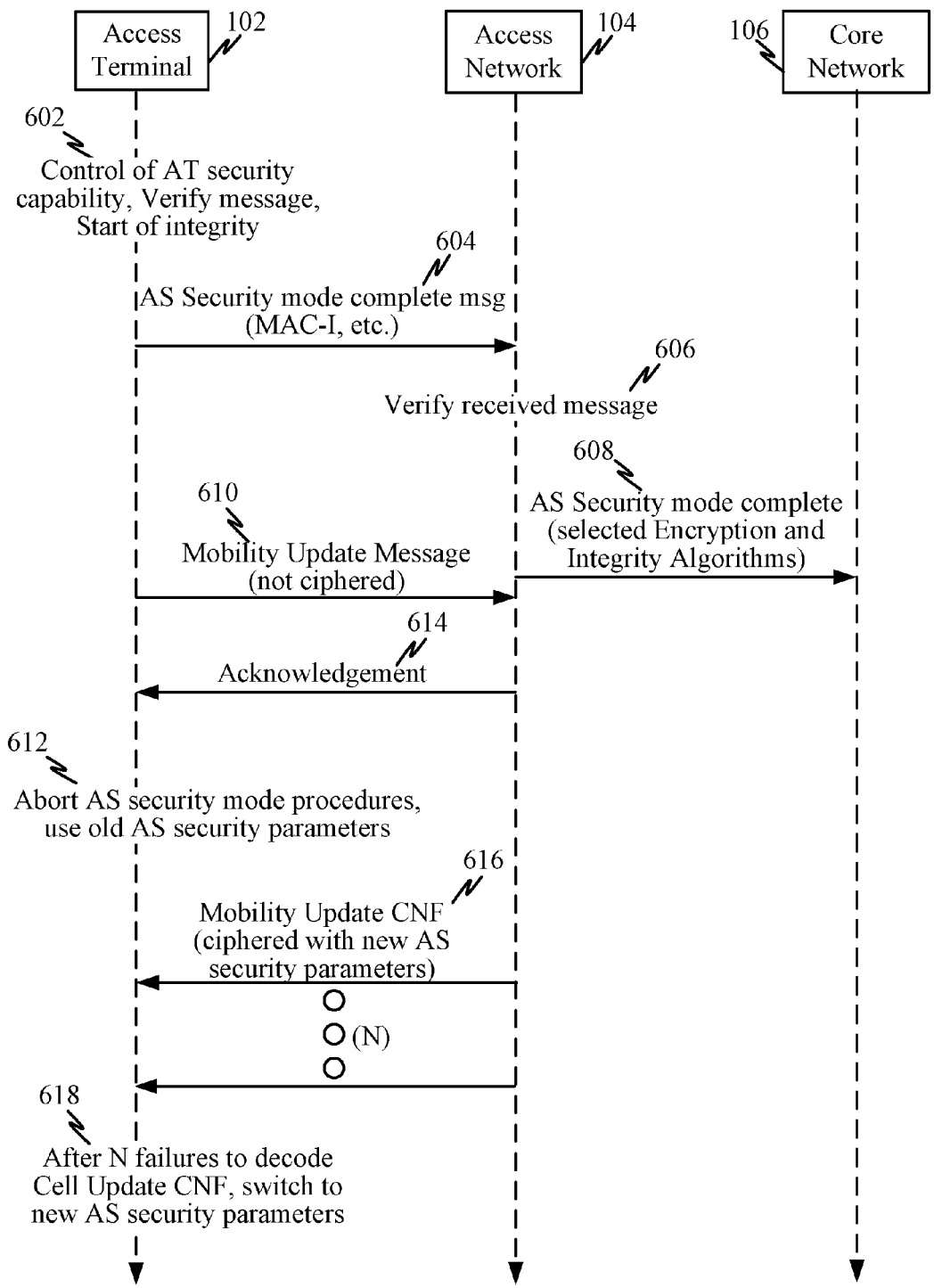
FIG. 6 is a flow diagram illustrating an example of a security parameter synchronization operation by an access terminal when the security parameters at the access network are updated and the security parameters at the access terminal are not updated.
Figure 7:
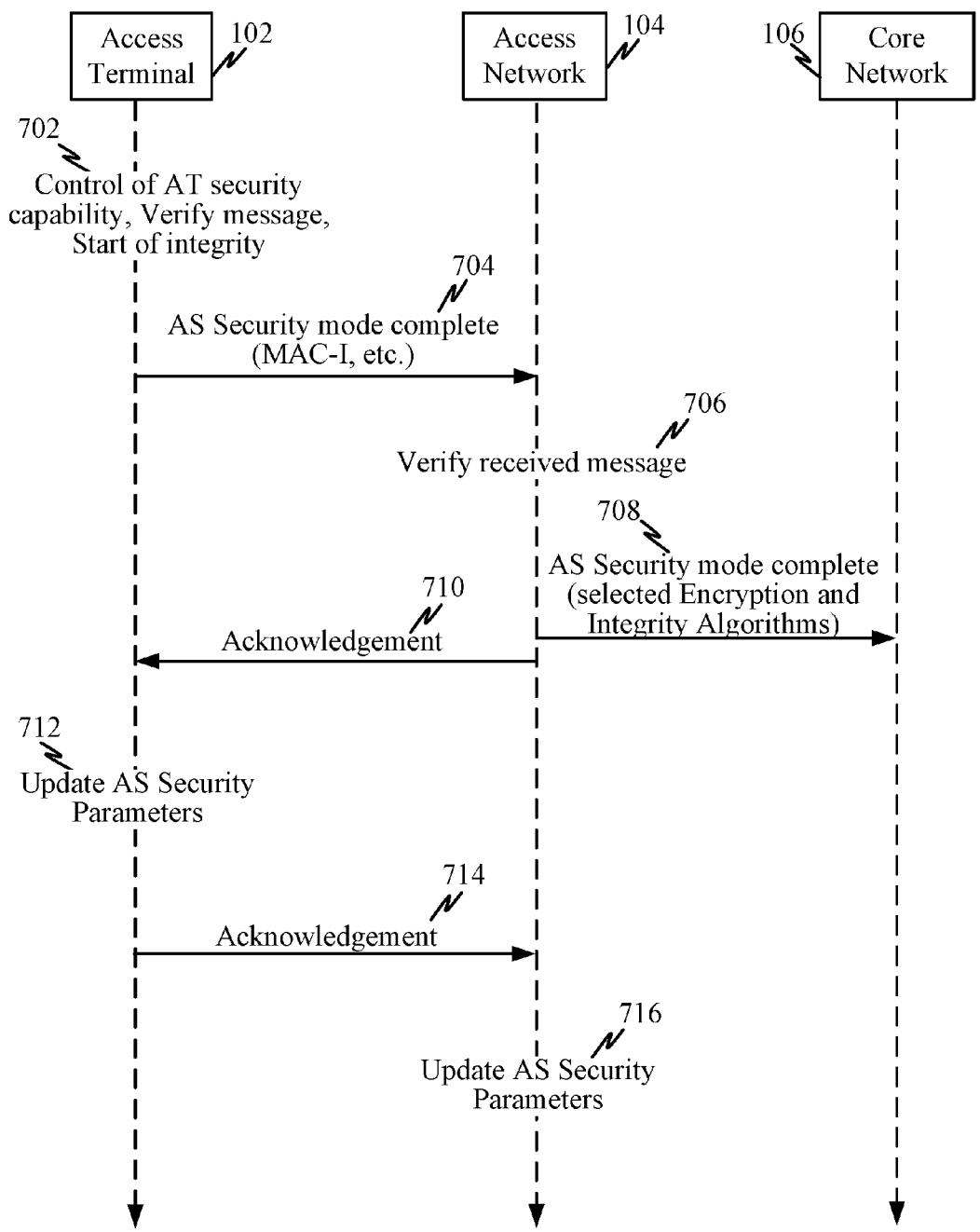
FIG. 7 is a flow diagram illustrating an example of a security parameter synchronization operation of an access terminal, access network and core network to facilitate updating of the security parameters at the access network only after the security parameters are updated at the access terminal.
Figure 8:
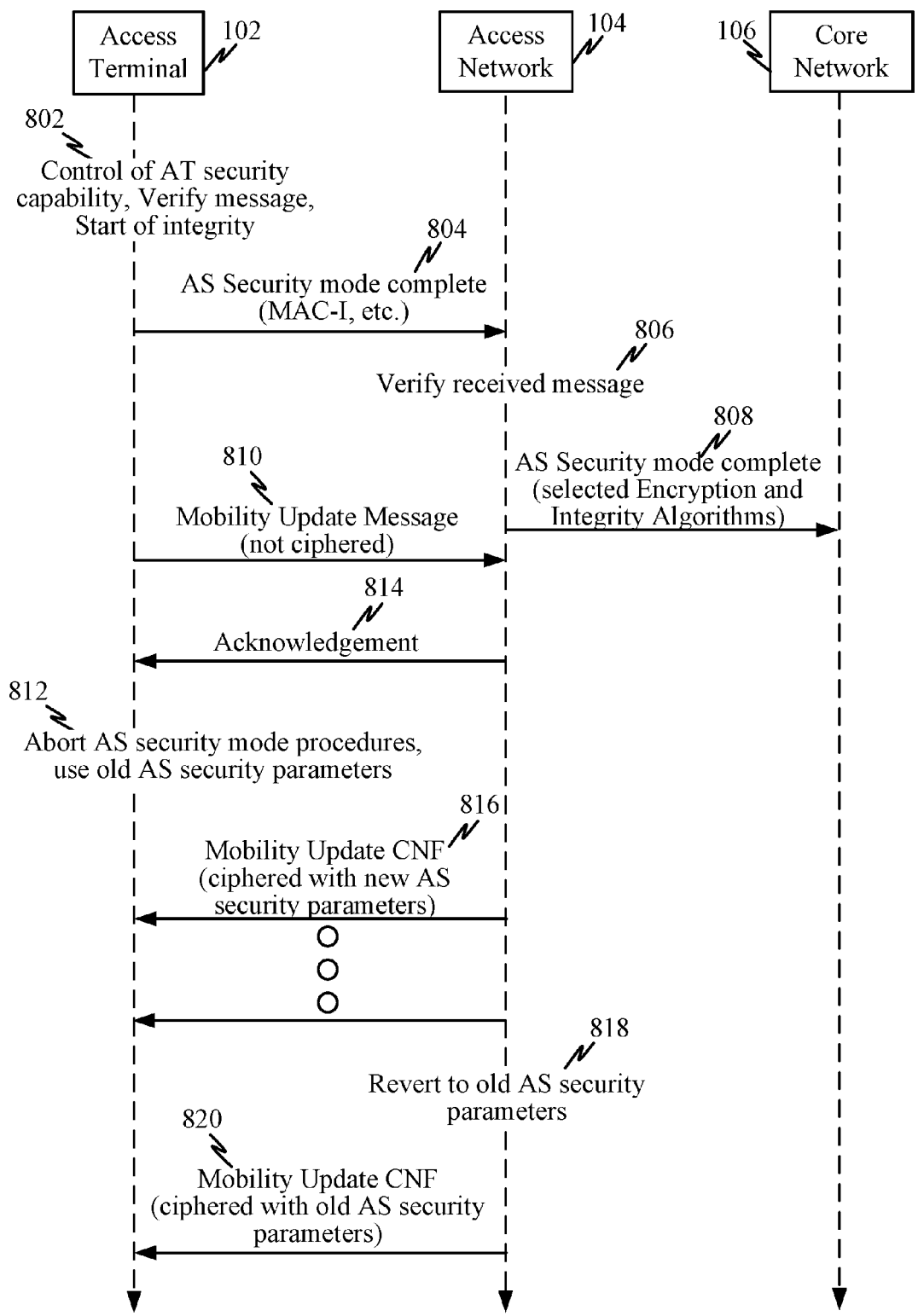
FIG. 8 is a flow diagram illustrating an example of a security parameter synchronization operation by an access network when the security parameters of the access network are updated and security parameters of the access terminal are not.

Exemplary Procedures for Synchronizing Security Parameters Between Access Terminals and Access Networks FIG. 5 (comprising FIGS. 5A and 5B) is a flow diagram illustrating an example of a security parameter synchronization operation by an access network when the security parameters of the access network are updated and security parameters of the access terminal are not. Although, the example illustrated in FIG. 5, as well as the examples in FIGS. 6-8, are directed to implementations involving an Access Stratum (AS) security mode procedure for initiating and updating the Access Stratum security parameters, the features described herein may be implemented in other security mode procedures, such as Non-Access Stratum (NAS) security mode procedures. The access terminal 102, access network 104 and core network 106 of FIG. 1 are used for illustrative purposes.

Initially, the access terminal 102 may establish a radio resource control (RRC) connection 502 with the access network 104. The message transmitted from the access terminal 102 to the access network 104 when the radio resource control (RRC) connection is established may include the access terminal's security capability information. The access terminal security capability information is adapted to inform the access network 104 about the ciphering (or encryption) algorithms and the integrity algorithms that are supported by the access terminal 102. The security capability information may also optionally include a classmark message indicating the GSM security algorithms supported by the access terminal 102 (e.g., GSM classmarks 2 and 3) and/or START values for the circuit-switched service domain and the packet-switched service domain. The information from the radio resource control (RRC) connection establishment message may be stored 504 at the access network 104.

The access terminal 102 may then send an initial direct transfer message 506 to the core network 106. The initial direct transfer message 506 may include, among other information, a user identity and a key set identifier (KSI) allocated by the circuit-switched service domain or the packet-switched service domain at the last authentication for this core network 106. According to at least one implementation, the initial direct transfer message may comprise a layer 3 (L3) message, such as a location update request, a CM service request, a routing area update request, an attach request, a paging response or other L3 message. The initial direct transfer message may be sent, for example to a visitor location register (VLR) for the circuit-switched service domain of the core network 106 or a GPRS support node (SGSN) for the packet-switched service domain of the core network 106.

Authentication of the access terminal 102 and generation of new security keys (e.g., integrity key (IK), ciphering key (CK)) may be performed between the access terminal 102 and the core network 106 using an authentication and key agreement (AKA) procedure 508. As part of the authentication and key agreement 508, a new key set identifier (KSI) may optionally be allocated.

Following the authentication and key agreement, the new security keys (e.g., integrity key (IK) and ciphering key (CK) can be employed to calculate Access Stratum (AS) keys. For example, the core network 106 can decide which ciphering algorithm and integrity algorithm are to be used in order of preference at 510. The core network 106 can then send an Access Stratum (AS) security mode command message 512 to the access network 104. The Access Stratum (AS) security mode command message 512 can be sent according to a radio access network application part (RANAP) protocol, and can be directed to the radio network controller (RNC) of the access network 104. This security mode command message 512 may include a list of allowed integrity algorithms in order of preference, and the integrity key (IK) to be used. If ciphering is to be initiated, the security mode command message 512 may also include a list of allowed ciphering algorithms in order of preference, and the ciphering key (CK) to be used. If authentication and key agreement (AKA) has been performed, this will be indicated to the access network 104 so the START values will be reset when new keys are initiated for use.

The access network 104 (e.g., the radio network controller (RNC)) decides which algorithms (e.g., integrity algorithm, ciphering algorithm) to use, generates a random value RAND, and starts integrity protection at 514. The access network 104 can then generate a radio resource control (RRC) message 516 comprising an Access Stratum (AS) security mode command message, and sends the message to the access terminal 102. The AS security mode command message 516 may include the access terminal's 102 security capability, the integrity algorithm and random value RAND to be used. If ciphering is to be started, the message 516 may also include the ciphering algorithm to be used. Additional information may also be included. Because the access terminal 102 may have two ciphering and integrity key sets, the network can indicate which key set is to be used. Before sending the AS security mode command message 516 to the access terminal 102, the access network 104 generates a message authentication code for integrity (MAC-I) and attaches this information to the AS security mode command message 516.

Turning now to FIG. 5B, the access terminal 102 receives the AS security mode command message, verifies that the security capability is the same as that sent in the radio resource control (RRC) connection establishment message and verifies the message by comparing the MAC-I with a generated XMAC-I at 518. The access terminal 102 can compute XMAC-I on the message received by using at least the indicated integrity algorithm and the received random value RAND parameter. If all checks are successful, then the access terminal 102 sends an Access Stratum (AS) security mode complete message 520 including a MAC-I. If the checks were not successful then a security mode reject message would have been sent.

When the access network 104 receives the AS security mode complete message, it verifies the integrity of the message by generating XMAC-I and comparing it with MAC-I included with the AS security mode complete message 522. An AS security mode complete message 524 is sent from the access network 104 to the core network 106 as a radio access network application part (RANAP) message indicating the algorithms selected for integrity and ciphering. An acknowledgement message 526 is sent from the access network 104 to the access terminal 102 to acknowledge receipt of the AS security mode complete message. According to at least some implementations, the acknowledgement message 526 may comprise an L2 acknowledgement.

The AS security mode complete message (e.g., 520) from the access terminal 102 to the access network 104 starts the downlink integrity protection, i.e., subsequent downlink messages sent to the access terminal 102 are integrity protected using the new security parameters. However, the uplink integrity protection does not begin until the access terminal 102 receives the acknowledgement message at step 526 from the access network 104, whereupon the access terminal 102 updates its security parameters at step 528. In other words, the access terminal 102 does not begin using the new Access Stratum (AS) security parameters for messages sent from the access terminal 102 to the access network 104 until the access terminal 102 receives an acknowledgement from the access network 104 that the Access Stratum (AS) security mode complete message was received and authenticated.

There exists a small window between the time when the Access Stratum (AS) security mode procedure is completed at the access network 104 (e.g., when the Access Stratum (AS) security mode complete message 520 is received at the access network 104) and when the AS security mode procedure is completed at the access terminal 102 (e.g., when the acknowledgement message 526 is received by the access terminal 102 and the Access Stratum (AS) security parameters are updated at 528). Because of this time window, it is possible for the access network 104 to update to the new Access Stratum (AS) security parameters, while the access terminal 102 remains with the old Access Stratum (AS) security parameters.

For example, the access terminal 102 is typically adapted to abort the Access Stratum (AS) security mode procedure when a mobility procedure is initiated, such as when a mobility update message is sent from the access terminal 102 to the access network 104. Consequently, the access terminal 102 may initiate a mobility procedure, including generating and sending a mobility update message 530 after the Access Stratum (AS) security mode complete message 520 is sent to the access network 104, and before receiving the acknowledgement 526 and/or updating the access terminal security parameters. As a result of initiated the mobility procedure, the access terminal 102 aborts the security mode procedure and reverts to the old Access Stratum (AS) security parameters 528. The access terminal 102 may receive an acknowledgement 526 after the mobility procedure is initiated, but the access terminal 102 has aborted the Access Stratum (AS) security mode procedure and has not, therefore, updated to the new Access Stratum (AS) security parameters, unbeknownst to the access network 104.

According to the implementation shown in FIG. 5B, the mobility update message 530 includes an indicator that informs the access network 104 that the access terminal 102 has aborted the AS security mode procedure and has reverted to the old AS security parameters. In at least some implementations, the indicator can comprise a new information element (IE) in the mobility update message. In some implementation, the indicator may comprise one or more bits of the mobility update message.

Upon receipt of the mobility update message including the indicator, the access network 104 reverts back to the old Access Stratum (AS) security parameters 532. The access network 104 may then generate and send a mobility update confirmation message 534 to the access terminal 102 that is ciphered using the old AS security parameters.

According to another feature, the access terminal 102 may be adapted to adjust to the new security parameters when it appears to the access terminal 102 that the access network 104 is operating with the new security parameters while the access terminal 102 is operating with the old security parameters. FIG. 6 is a flow diagram illustrating an example of a security parameter synchronization operation by an access terminal when the security parameters at the access network are updated and the security parameters at the access terminal are not. The steps shown in FIG. 6 correspond to steps following all the steps described and shown in relation to FIG. 5A. That is, FIG. 6 is intended to show the steps that follow after the steps of FIG. 5A are completed.

As noted above with reference to FIG. 5B, at reception of the Access Stratum (AS) security mode command message, the access terminal 102 verifies the security capability is the same as that sent in the radio resource control (RRC) connection establishment message, computes XMAC-I and verifies the integrity of the AS security mode command message by comparing the received MAC-I with the generated XMAC-I 602. If all checks are successful, then the access terminal 102 sends an Access Stratum (AS) security mode complete message 604 including a MAC-I. If the checks were not successful then an Access Stratum (AS) security mode reject message would have been sent. When the access network 104 receives the AS security mode complete message, it verifies the integrity of the message at step 606, and sends an AS security mode complete message 608 to the core network 106 indicating the selected encryption and integrity algorithms.

As noted above, in some instances, the access network 104 may update to the new Access Stratum (AS) security parameters while the access terminal 102 fails to update to the new AS security parameters. For example, after sending the AS security mode complete message 604 to the access network 104, and before receiving an acknowledgement and/or updating the Access Stratum (AS) security parameters, the access terminal 102 may begin a mobility procedure in which the access terminal 102 generates and sends a mobility update message 610 to the access network 104. In response to initiating the mobility procedure, the access terminal 102 aborts the security mode procedure and reverts to the old Access Stratum (AS) security parameters 612. The access terminal 102 may receive an acknowledgement message 614 after initiating the mobility procedure, but the access terminal 102 will have already aborted the Access Stratum (AS) security mode procedure and does not, therefore, updated to the new Access Stratum (AS) security parameters, unbeknownst to the access network 104.

In such instances, the mobility update message sent at step 610 is typically not encrypted, resulting in the access network 104 being able to receive and process the mobility update message even when the access terminal 102 is operating with the old Access Stratum (AS) security parameters. In the implementation shown in FIG. 6, the access network 104 receives the mobility update message 610 and responds with a mobility update confirmation 616 that is ciphered with the new AS security parameters and is, therefore, not decodable by the access terminal 102 using the old AS security parameters. When the access network 104 fails to receive a response to the mobility update confirmation message, the access network 104 resends the mobility update confirmation. The access terminal 102 may be adapted to keep track of the number of times that it receives and fails to decode the mobility update confirmation message. After a predetermined number of tries (N), the access terminal 102 may switch to the new AS security parameters 618. After switching to the new AS security parameters, the access terminal 102 can attempt to decode the mobility update confirmation message using the new AS security parameters. If successful, the access terminal 102 will continue to use the new AS security parameters from that point forward.

According to another feature, the access network 104 may be adapted to complete the security mode procedure and update its security parameters only after receiving a final acknowledgement message from the access terminal 102. FIG. 7 is a flow diagram illustrating an example of a security parameter synchronization operation of an access terminal 102, access network 104 and core network 106 to facilitate updating of the security parameters at the access network 104 only after the security parameters are updated at the access terminal 102. The steps shown in FIG. 7 correspond to steps following all the steps described and shown in relation to FIG. 5A. That is, FIG. 7 is intended to show the steps that follow after the steps of FIG. 5A are completed.

As noted above with reference to FIG. 5B, at reception of the Access Stratum (AS) security mode command message, the access terminal 102 verifies the security capability is the same as that sent in the radio resource control (RRC) connection establishment message, computes XMAC-I and verifies the integrity of the message by comparing the received MAC-I with the generated XMAC-I 702. If all checks are successful, then the access terminal 102 sends an Access Stratum (AS) security mode complete message 704 including a MAC-I. If the checks were not successful then an AS security mode reject message would have been sent. When the access network 104 receives AS security mode complete message, it verifies the integrity of the message at step 706, and sends an AS security mode complete message 708 to the core network 106 indicating the selected encryption and integrity algorithms.

In the implementation shown in FIG. 7, the access network 104 does not complete the AS security mode procedure upon receipt and verification of an AS security mode complete message. That is, the access network 104 is adapted to not update to the new AS security parameters upon receipt and verification of the AS security mode complete message 704. Instead, the access network 104 sends an acknowledgement message 710 to the access terminal 102. The acknowledgement message 710 may comprise an L2 acknowledgement message. In response to receiving the acknowledgement message 710, the access terminal 102 updates to the new AS security parameters 712. The access terminal 102 can send an acknowledgement message 714 to the access network 104. For example, the access terminal 102 may send an L3 acknowledgement message to the access network 104 to indicate that it has updated to the new AS security parameters. The access network 104 then updates to the new AS security parameters 716 in response to receipt of the acknowledgement message 714 from the access terminal 102.

According to the implementation in FIG. 7, if the access terminal 102 aborts the Access Stratum (AS) security mode procedure (e.g., initiates a mobility procedure) after sending the AS security mode complete message 704 to the access network 104, but before updating to the new security parameters, the access network 104 will not receive the acknowledgement 714 and will not update to the new AS security parameters. In other words, if the access terminal 102 aborts the AS security mode procedure before completion of the procedure (e.g., before updating to the new AS security parameters), then the acknowledgment message 714 will not be sent and the access network 104 will not be updated to the new AS security parameters.

According to another feature, the access network 104 may be adapted to revert back to the old security parameters when it appears to the access network 104 that the access terminal 102 is operating with the old security parameters while the access network 104 is operating with the new security parameters. FIG. 8 is a flow diagram illustrating an example of a security parameter synchronization operation by an access network when the security parameters of the access network are updated and the security parameters of the access terminal are not. The steps shown in FIG. 8 correspond to steps following all the steps described and shown in relation to FIG. 5A. That is, FIG. 8 is intended to show the steps that follow after the steps of FIG. 5A are completed.

As noted above with reference to FIG. 5B, at reception of the Access Stratum (AS) security mode command message, the access terminal 102 verifies the security capability is the same as that sent in the RRC connection establishment message, computes XMAC-I, and verifies the integrity of the AS security mode command message by comparing the received MAC-I with the generated XMAC-I 802. If all checks are successful, then the access terminal 102 sends an Access Stratum (AS) security mode complete message 804 including a MAC-I. If the checks were not successful then an AS security mode reject message would have been sent. When access network 104 receives this AS security mode complete message 804, it verifies the integrity of the message 806, and sends an AS security mode complete message 808 to the core network 106 indicating the selected encryption and integrity algorithms.

As noted above, in some instances, the access network 104 may update to the new AS security parameters while the access terminal 102 fails to update to the new AS security parameters. For example, after sending the AS security mode complete message 804 to the access network 104, and before receiving an acknowledgement and/or updating the access terminal to the new AS security parameters, the access terminal 102 may initiate a mobility procedure, including generating and sending a mobility update message 810. As a result of initiating the mobility procedure, the access terminal 102 aborts the AS security mode procedure and reverts to the old AS security parameters 812. The access terminal 102 may receive an acknowledgement message 814 after initiating the mobility procedure, but the access terminal 102 will have already aborted the AS security mode procedure and will not, therefore, update to the new AS security parameters, unbeknownst to the access network 104.

In such instances, the mobility update message 810 is conventionally not encrypted, so that the access network 104 can receive and process the mobility update message 810 even when the access terminal 102 is operating with the old AS security parameters. However, when the access network 104 sends a mobility update confirmation message 816, that message 816 is ciphered with the new AS security parameters and will, therefore, not be decodable by the access terminal 102.

In the implementation shown in FIG. 8, the access network 104 may be adapted to send the mobility update confirmation 816 one or more times. After the access network 104 has sent the message to the access terminal 102 a specified number of times without receiving a response from the access terminal 102, the access network can be adapted to revert back to the old AS security parameters 518 and re-send the mobility update confirmation message 820 using the old AS security parameters. If the access network 104 receives a response to the mobility update confirmation message sent using the old AS security parameters, then the access network 104 can continue using the old AS security parameters.

Exemplary Access Terminal

Figure 9:
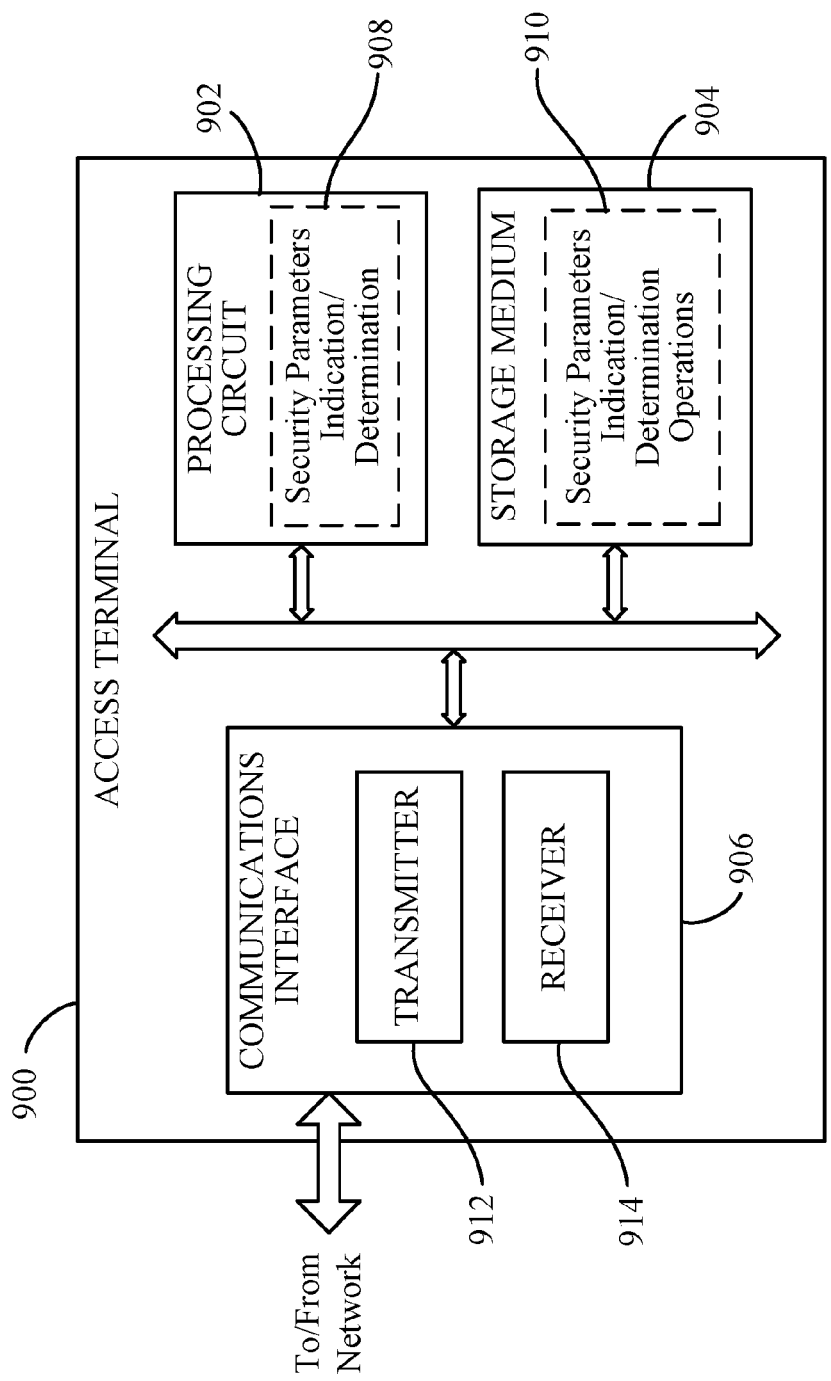
FIG. 9 is a block diagram illustrating select components of an access terminal according to at least one embodiment.

FIG. 9 is a block diagram illustrating select components of an access terminal 900 according to at least one embodiment. The access terminal 900 generally includes a processing circuit 902 coupled to a storage medium 904 and a wireless communications interface 906.

The processing circuit 902 is arranged to obtain, process and/or send data, control data access and storage, issue commands, and control other desired operations. The processing circuit 902 may comprise circuitry configured to implement desired programming provided by appropriate media in at least one embodiment. For example, the processing circuit 902 may be implemented as one or more of a processor, a controller, a plurality of processors and/or other structure configured to execute executable instructions including, for example, software and/or firmware instructions, and/or hardware circuitry. Embodiments of the processing circuit 902 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 902 are for illustration and other suitable configurations within the scope of the present disclosure are also contemplated.

The processing circuit 902 can include a security parameters indication and/or determination module 908. The security parameters indication and/or determination module 908 can comprise circuitry and/or programming adapted to perform security parameters indication procedures and/or security parameters determination procedures.

The storage medium 904 may represent one or more devices for storing programming and/or data, such as processor executable code or instructions (e.g., software, firmware), electronic data, databases, or other digital information. The storage medium 904 may be any available media that can be accessed by a general purpose or special purpose processor. By way of example and not limitation, the storage medium 904 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 904 may be coupled to the processing circuit 902 such that the processing circuit 902 can read information from, and write information to, the storage medium 904. In the alternative, the storage medium 904 may be integral to the processing circuit 902.

The storage medium 904 can include security parameters indication operations and/or security parameters determination operations 910, according to one or more embodiments. The security parameters indication operations and/or security parameters determination operations 910 can be implemented by the processing circuit 902 in, for example, the security parameters indication and/or determination module 908. In some implementations, security parameters indication operations may comprise operations that can be implemented by the processing circuit 902 to indicate a status of the access terminal's 900 security parameters to an access network, such as by including an indicator in a mobility update message that the access terminal 900 has reverted to old security parameters and/or sending a message indicating that the access terminal 900 has successfully updated to the new security parameters. In some implementations, security parameters determination operations may comprise operations that can be implemented by the processing circuit 902 to determine a status of the security parameters at an access network for communicating with the access terminal 900, such as by determining its failure to decode a mobility update confirmation message received from the access network.

The communications interface 906 is configured to facilitate wireless communications of the access terminal 900. For example, the communications interface 906 may be configured to communicate information bi-directionally with respect to an access network and/or other access terminals. The communications circuit 906 may be coupled to an antenna (not shown) and may include wireless transceiver circuitry, including at least one transmitter 912 and/or at least one receiver 914 (e.g., one or more transmitter/receiver chains).

According to one or more features of the access terminal 900, the processing circuit 902 may be adapted to perform any or all of the processes, functions, steps and/or routines related to the various access terminals described herein above with reference to FIGS. 1-8 (e.g., access terminal 102 and/or 402). As used herein, the term "adapted" in relation to the processing circuit 902 may refer to the processing circuit 902 being one or more of configured, employed, implemented, or programmed to perform a particular process, function, step and/or routine according to various features described herein.

Figure 10:
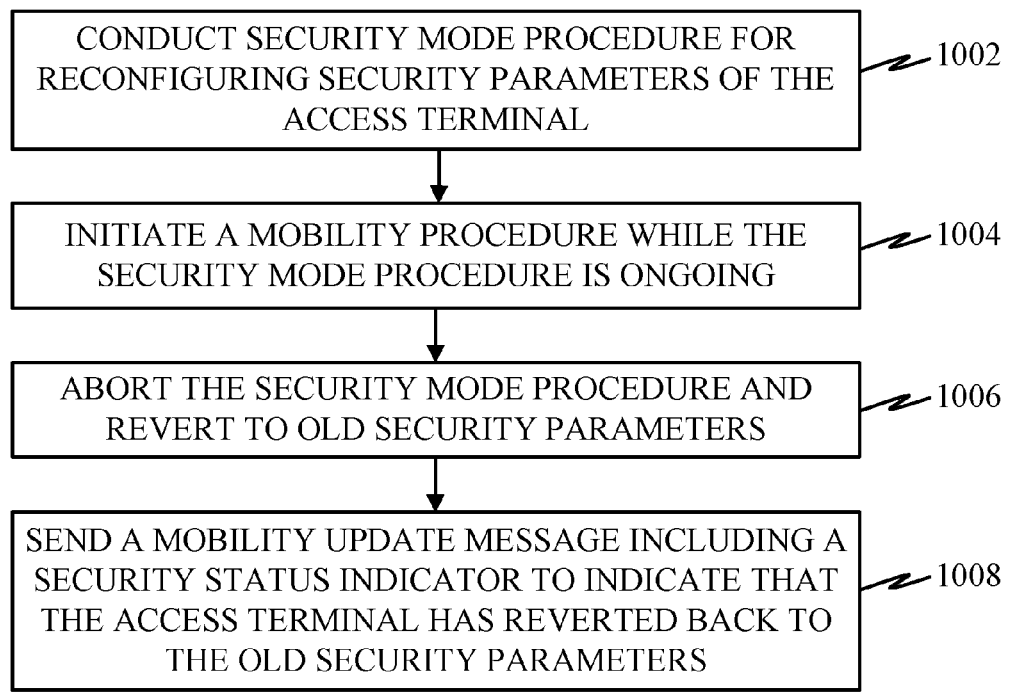
FIG. 10 is a flow diagram illustrating an example of a method operational in an access terminal for indicating to an access network when the access terminal has reverted to old security parameters.

FIG. 10 is a flow diagram illustrating an example of a method operational in an access terminal, such as access terminal 900, for indicating to an access network when the access terminal has reverted to old security parameters. Referring to both of FIGS. 9 and 10, an access terminal 900 may conduct a security mode procedure at step 1002. For example the processing circuit 902 may communicate with an access network via the communications interface 906 to conduct the security mode procedure. As part of the security mode procedure, the processing circuit 902 can generate and send a security mode complete message to the access network. According to at least some implementations, the security mode procedure may comprise an Access Stratum (AS) security mode procedure, where the processing circuit 902 generates and sends an Access Stratum (AS) security mode complete message. The processing circuit 902 may send such an AS security mode complete message using a radio resource control (RRC) layer of the protocol stack to communicate with the access network.

At step 1004, after the access terminal 900 sends a security mode complete message to the access network, a mobility procedure may be initiated while the security mode procedure is still active. For example, as a result of mobility of the access terminal 900, the processing circuit 902 may initiate a mobility procedure. Examples of mobility procedure may include cell reselection, radio link control (RLC) unrecoverable errors, the access terminal being out of service, etc.

In response to initiating a mobility procedure prior to updating its security parameters (e.g., prior to receiving an acknowledgement of the security mode complete message or prior to updating in response to the acknowledgement), the access terminal 900 aborts the ongoing security mode procedure and reverts back to the old security parameters at step 1006. For example, the processing circuit 902 may abort the active security mode procedure and revert back to employing the old security parameters (e.g., the old Access Stratum (AS) security parameters) in response to initiating the mobility procedure.

At step 1008, the access terminal 900 can generate and send a mobility update message to the access network. The mobility update message includes an indicator adapted to inform the access network that the access terminal 900 has reverted back to the old security parameters. For example, the processing circuit 902 can be adapted to generate a mobility update message including an information element (IE) that indicates that the access terminal 900 has reverted back to the old security parameters by aborting the ongoing security mode procedure. In at least one implementation, the security parameters indication and/or determination module 908 can comprise a security parameters indication module that is adapted to execute security parameters indication operations 910 stored in the storage medium 904 to generate the mobility update message with the information element (IE) comprising a dedicated security status indicator adapted to indicate that the access terminal 900 has reverted by the old security parameters.

The processing circuit 902 can send the generated mobility update message including the indicator to the access network via the communications interface 906. The mobility update message may be sent by the processing circuit 902 as a radio resource control (RRC) message at the radio resource control (RRC) layer of the protocol stack. According to at least some implementations, the mobility update message sent by the processing circuit 902 may not be ciphered (i.e., may be unencrypted) so that the access network can receive and process the message without a knowledge of the security parameters actively implemented by the access terminal 900. The mobility update message can comprise any message resulting from mobility of the access terminal 900 such as, for example, a cell reselection message, a radio link control (RLC) unrecoverable error message, an out of service message, etc.

The access terminal 900 may receive, in response to the mobility update message, a mobility update confirmation message that is ciphered according to the old security parameters. For example, the processing circuit 902 may receive a mobility update confirmation message via the communications interface 906. The received mobility update confirmation message is ciphered according to the old security parameters and can be decoded by the processing circuit 902 employing the old security parameters according to an agreed-on algorithm.

Figure 11:
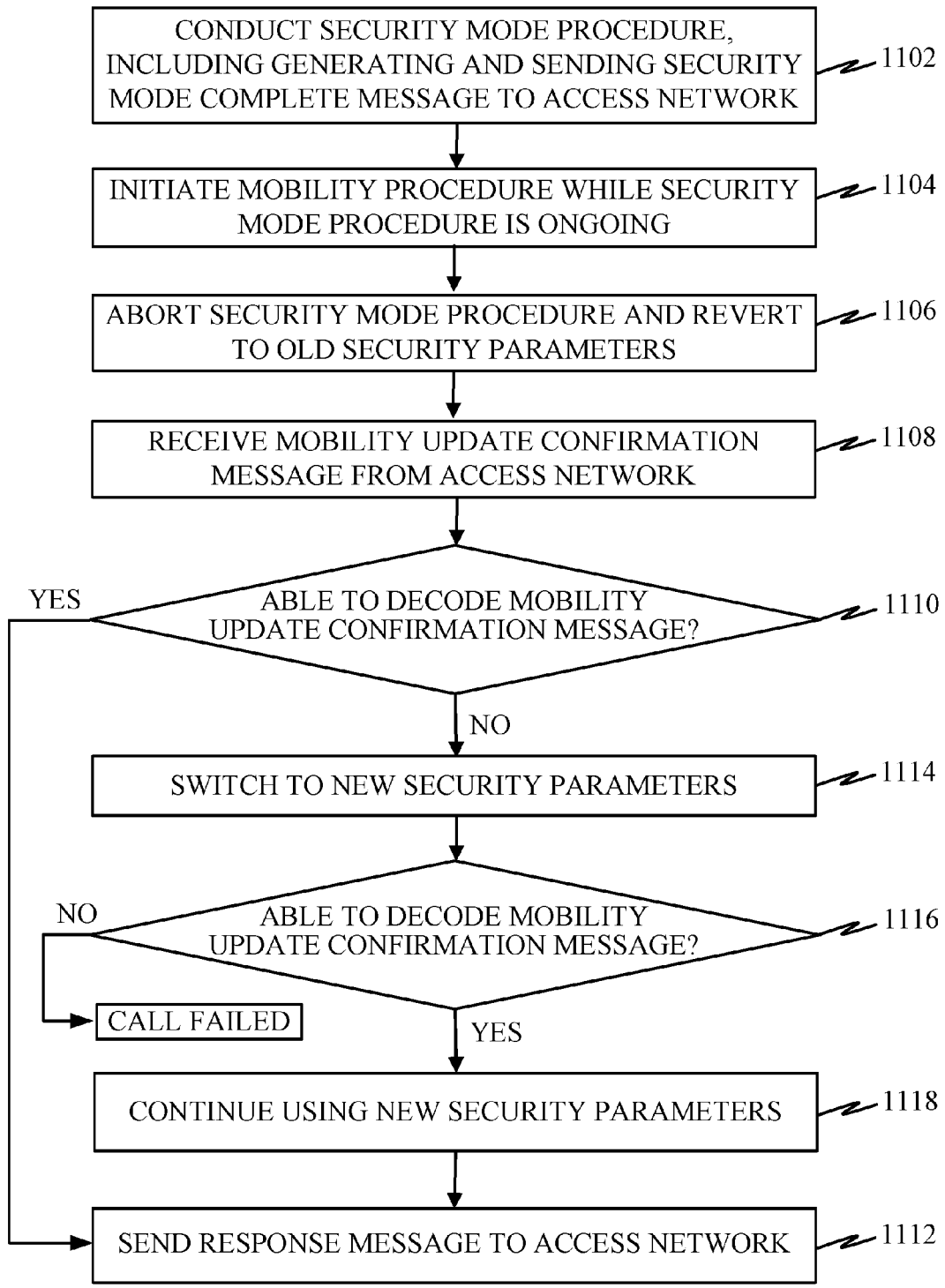
FIG. 11 is a flow diagram illustrating an example of a method operational in an access terminal for determining a status of the security parameters at an access network for communicating with the access terminal.

FIG. 11 is a flow diagram illustrating an example of a method operational in an access terminal, such as access terminal 900, for determining a status of the security parameters at an access network for communicating with the access terminal. Referring to both of FIGS. 9 and 11, an access terminal 900 may conduct a security mode procedure at step 1102. For example the processing circuit 902 may communicate with an access network via the communications interface 906 to conduct the security mode procedure. As part of the security mode procedure, the processing circuit 902 can generate and send a security mode complete message to the access network. The processing circuit 902 may send the security mode complete message as a radio resource control (RRC) message to the access network.

At step 1104, after the access terminal 900 sends a security mode complete message to the access network, a mobility update procedure may be initiated while the security mode procedure is still active. For example, as a result of mobility of the access terminal 900, the processing circuit 902 may initiate a mobility procedure. Examples of mobility procedures may include cell reselection, radio link control (RLC) unrecoverable errors, the access terminal being out of service, etc. As part of the mobility procedure, the access terminal 900 sends a mobility update message to the access network.

In response to initiating a mobility procedure, and before updating its security parameters (e.g., prior to receiving an L2 acknowledgement or prior to updating in response to the L2 acknowledgement), the access terminal 900 aborts the ongoing security mode procedure and reverts back to the old security parameters at step 1106. For example, the processing circuit 902 may abort the active security mode procedure and revert back to employing the old security parameters as a result of initiating the mobility procedure.

In response to mobility update message sent to the access network as part of the mobility procedure, the access terminal 900 receives a mobility update confirmation message from the access network at step 1108. For example, the processing circuit 902 can receive a mobility update confirmation message via the communications interface 906. At step 1110, the processing circuit 902 attempts to decode the mobility update confirmation message using the old security parameters. For example, the processing circuit 902 may include a security parameters determination module 908 adapted to execute security parameters determination operations 910 stored in the storage medium 904. If the processing circuit 902 is able to decode the mobility update confirmation message, then the access terminal sends a response message to the access network at step 1112. In this case, the response message would be ciphered using the old security parameters.

If, however, processing circuit 902 (e.g., the security parameters determination module 908) is unable to decode the mobility update confirmation message, then the processing circuit 902 may switch to the new security parameters at step 1114 and may attempt to decode the mobility update confirmation message using the new security parameters. According to at least one implementation, the processing circuit 902 (e.g., the security parameters determination module 908) may be adapted to switch to the new security parameters after some predetermined number of failed attempts to decode the mobility update confirmation message (e.g., one or more attempts).

If the processing circuit 902 is successful in decoding the mobility update confirmation message using the new security parameters, then the processing circuit 902 can be adapted to continue using the new security parameters at step 1118. The processing circuit 902 may then send a response message to the access network via the communications interface 906 using the new security parameters at step 1112. If the processing circuit 902 is unsuccessful in decoding the mobility update confirmation message using the new security parameters, then the call may fail.

Figure 12:
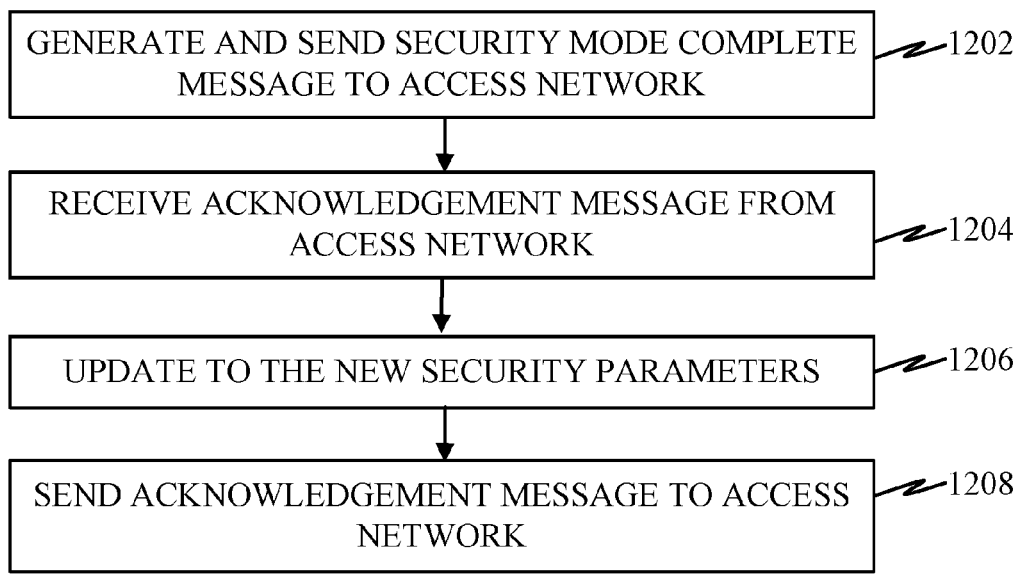
FIG. 12 is a flow diagram illustrating an example of a method operational in an access terminal for indicating to an access network when the access terminal has updated to new security parameters.

FIG. 12 is a flow diagram illustrating an example of a method operational in an access terminal, such as access terminal 900, for indicating to an access network when the access terminal has updated to new security parameters. Referring to both of FIGS. 9 and 12, an access terminal 900 conducting a security mode procedure may generate and send a security mode complete message to the access network at step 1202. For example the processing circuit 902 (e.g., a security parameters indication module 908) may generate and send a security mode complete message via the communications interface 906. The processing circuit 902 may send the security mode complete message as a radio resource control (RRC) message to the access network.

At step 1204, the processing circuit 902 can receive via the communications interface 906 an acknowledgement message from the access network. The acknowledgement message is received in response to the security mode complete message and may comprise an L2 transmission. The acknowledgement message may indicate to the processing circuit 902 that the security mode complete message was successfully received by the access network. In response to receipt of the acknowledgement message, the processing circuit 902 updates the security parameters of the access terminal 900 to the new security parameters at step 1206.

After the access terminal 900 is updated to the new security parameters, the processing circuit 902 sends an indication to the access network at step 908 to inform the access network that the access terminal 900 has successfully updated to the new security parameters. For example, the processing circuit 902 (e.g., the security parameters indication module 908) can generate and send an L3 acknowledgement message to the access network via the communications interface 906 to indicate that the access terminal 900 has successfully updated to the new security parameters.

Exemplary Network Entity

Figure 13:
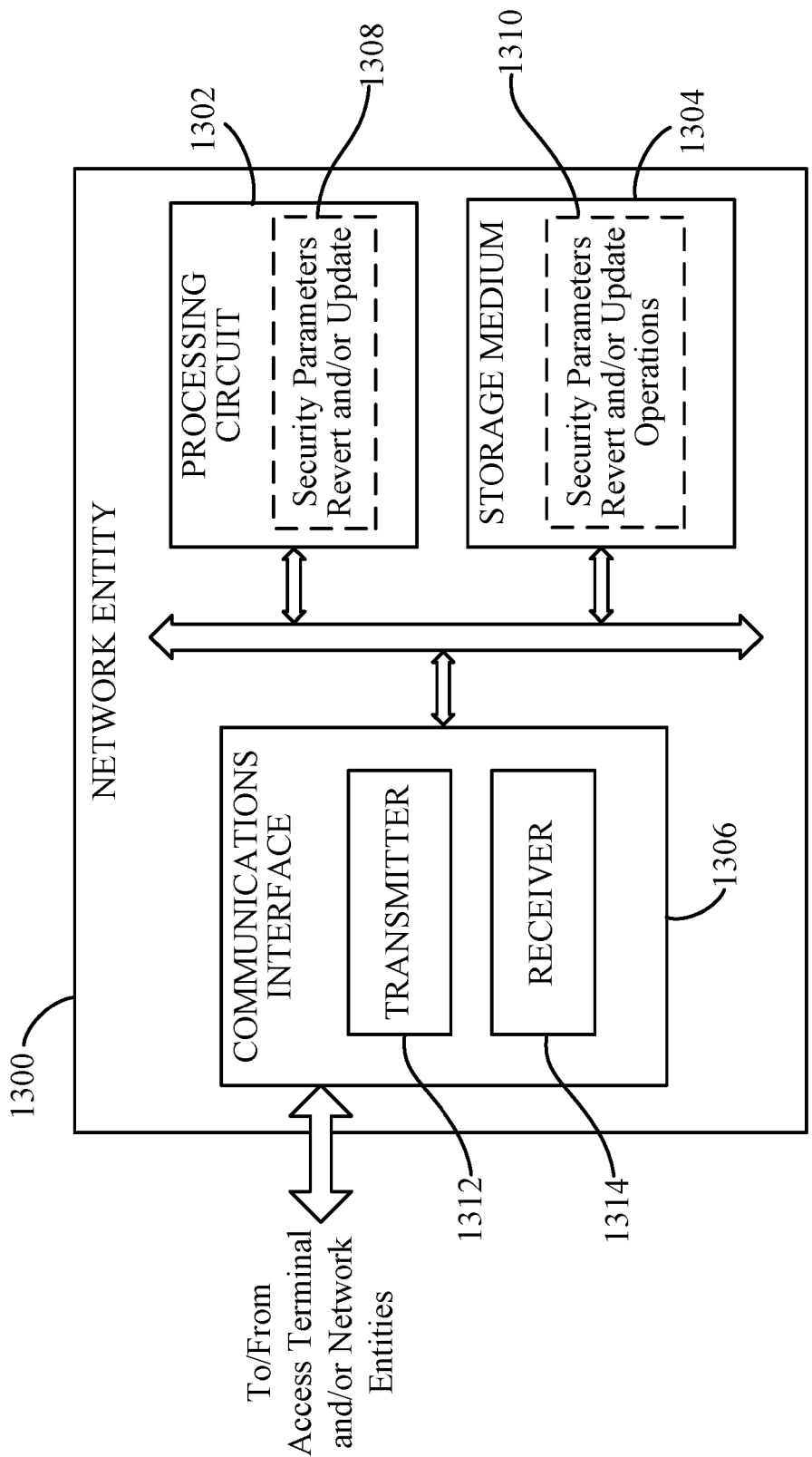
FIG. 13 is a block diagram illustrating select components of a network entity according to at least one embodiment.

FIG. 13 is a block diagram illustrating select components of a network entity 1300 according to at least one embodiment. According to at least some implementations, the network entity 1300 may comprise a radio network controller (RNC) of an access network, such as RNC 114 in FIG. 1. The network entity 1300 generally includes a processing circuit 1302 coupled to a storage medium 1304 and a communications interface 1306.

The processing circuit 1302 is arranged to obtain, process and/or send data, control data access and storage, issue commands, and control other desired operations. The processing circuit 1302 may comprise circuitry configured to implement desired programming provided by appropriate media in at least one embodiment. For example, the processing circuit 1302 may be implemented as one or more of a processor, a controller, a plurality of processors and/or other structure configured to execute executable instructions including, for example, software and/or firmware instructions, and/or hardware circuitry. Embodiments of the processing circuit 1302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 1302 are for illustration and other suitable configurations within the scope of the present disclosure are also contemplated.

The processing circuit 1302 can include a security parameters revert and/or update module 1308. The security parameters revert and/or update module 1308 can comprise circuitry and/or programming adapted to perform procedures for reverting to old security parameters and/or procedures for updating to new security parameters, according to various implementations.

The storage medium 1304 may represent one or more devices for storing programming and/or data, such as processor executable code or instructions (e.g., software, firmware), electronic data, databases, or other digital information. The storage medium 1304 may be any available media that can be accessed by a general purpose or special purpose processor. By way of example and not limitation, the storage medium 1304 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 1304 may be coupled to the processing circuit 1302 such that the processing circuit 1302 can read information from, and write information to, the storage medium 1304. In the alternative, the storage medium 1304 may be integral to the processing circuit 1302.

The storage medium 1304 can include security parameters revert and/or update operations 1310, according to one or more embodiments. The security parameters revert and/or update operations 1310 can be implemented by the processing circuit 1302 in, for example, the security parameters revert and/or update module 1308. In some implementations, security parameters revert operations may comprise operations that can be implemented by the processing circuit 1302 to determine whether to revert to old security parameters and to carry out the reversion back to the old security parameters. In some implementations, security parameters update operations may comprise operations that can be implemented by the processing circuit 1302 to update the security parameters.

The communications interface 1306 is configured to facilitate wireless communications of the network entity 1300. For example, the communications interface 1306 may be configured to communicate information bi-directionally with respect to one or more access terminals and/or other network entities. The communications circuit 1306 may be coupled to an antenna (not shown) and may include wireless transceiver circuitry, including at least one transmitter 1312 and/or at least one receiver 1314 (e.g., one or more transmitter/receiver chains).

According to one or more features of the network entity 1300, the processing circuit 1302 may be adapted to perform any or all of the processes, functions, steps and/or routines related to one or more of the various network entities described herein above with reference to FIGS. 1-8 (e.g., an entity of access network 104, such as access node 112 and/or radio network controller (RNC) 114, or an entity of core network 106, such as serving GPRS support node (SGSN) 116 and/or mobile switching center (MSC) 118). As used herein, the term "adapted" in relation to the processing circuit 1302 may refer to the processing circuit 1302 being one or more of configured, employed, implemented, or programmed to perform a particular process, function, step and/or routine according to various features described herein.

Figure 14:
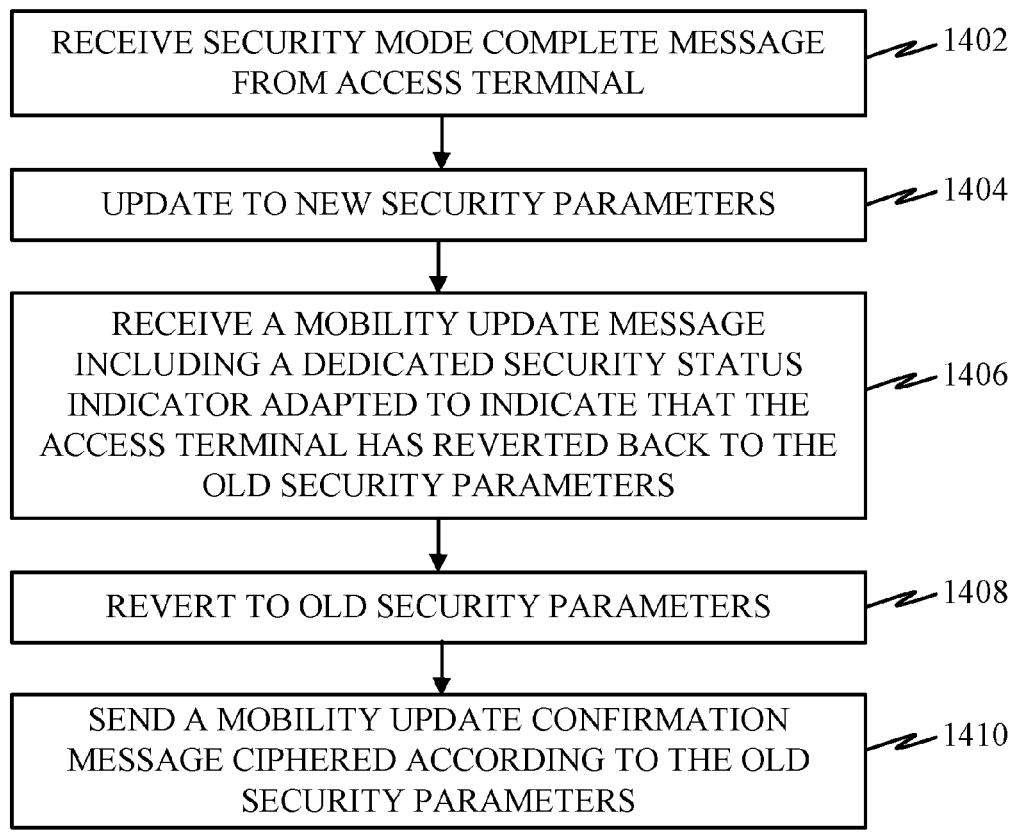
FIG. 14 is a flow diagram illustrating an example of a method operational in a network entity for determining that an access terminal has reverted to old security parameters.

FIG. 14 is a flow diagram illustrating an example of a method operational in a network entity, such as network entity 1300, for determining that an access terminal has reverted to old security parameters. Referring to both of FIGS. 13 and 14, a network entity 1300 may receive a security mode complete message from an access terminal at step 1402. For example, the processing circuit 1302 may receive a security mode complete message via the communications interface 1306. In at least some implementations, the security mode complete message may comprise an Access Stratum (AS) security mode complete message. The AS security mode complete message can be received via the communications interface 1306 at a radio resource control (RRC) layer of the protocol stack.

In response to the security mode complete message received from the access terminal, the network entity 1300 may update to new security parameters for communications between the network entity 1300 and the access terminal at step 1404. In at least one implementation, the processing circuit 1302 can be adapted to update the security parameters associated with the access terminal to new security parameters in response to receiving the security mode complete message. In implementations where the security mode complete message comprises an AS security mode complete message, the new security parameters can comprise new Access Stratum (AS) security parameters. The processing circuit 1302 can be adapted to retain the old security parameters for a specified period of time after updating to the new security parameters. For example, the processing circuit 1302 may store the old security parameters in the storage medium 1304 for a period of time (e.g., until a communication is received from the access terminal employing the new security parameters).

At step 1406, the network entity 1300 may receive a mobility update message from the access terminal, where the mobility update message includes a dedicated security status indicator adapted to indicate to the network entity 1300 that the access terminal has reverted back to the old security parameters. For example, the processing circuit

1302 may receive the mobility update message via the communications interface 1306. The mobility update message may be received as a radio resource control (RRC) message. According to at least one implementation, the mobility update message is not ciphered, and can be read by the processing circuit 1302 without decoding the message first. The mobility update message may comprise a message sent by the access terminal for mobility reasons. By way of example and not limitation, the mobility update message may comprise a cell reselection message, a radio link control (RLC) unrecoverable error message, an out of service message, etc.

In some implementations, the dedicated status indicator included with the mobility update message may comprise an information element (IE) adapted to indicate that the access terminal has reverted back to the old security parameters. In some implementations, the dedicated status indicator included with the mobility update message may comprise one or more bits adapted to indicate that the access terminal has reverted back to the old security parameters.

At step 1408, the network entity 1300 reverts back to the old security parameters. For example, the processing circuit 1302 may revert back to the old security parameters in response to the received mobility update message including the dedicated security status indicator. In some implementations, the security parameters revert and/or update module 1308 may execute the security parameters revert and/or update operations 1310 on receipt of the dedicated security status indicator informing the network entity 1300 that the access terminal has reverted back to the old security parameters. As part of the security parameters revert and/or update operations 1310, the security parameters revert and/or update module 1308 may retain an association between the access terminal and the old security parameters to be able to replace the new security parameters with the previous (or old) security parameters. In this manner, the processing circuit 1302 can employ the old security parameters for subsequent communications with the access terminal.

In response to the received mobility update message, the network entity 1300 may send a mobility update confirmation message to the access terminal at step 1410 to acknowledge receipt of the mobility update message. The mobility update confirmation message may be ciphered according to the old security parameters. In at least some implementations, the processing circuit 1302 may generate a mobility update confirmation message and may cipher the mobility update confirmation message according to the old security parameters. The processing circuit 1302 may then send the ciphered mobility update confirmation message to the access terminal via the communications interface 1306.

Figure 15:
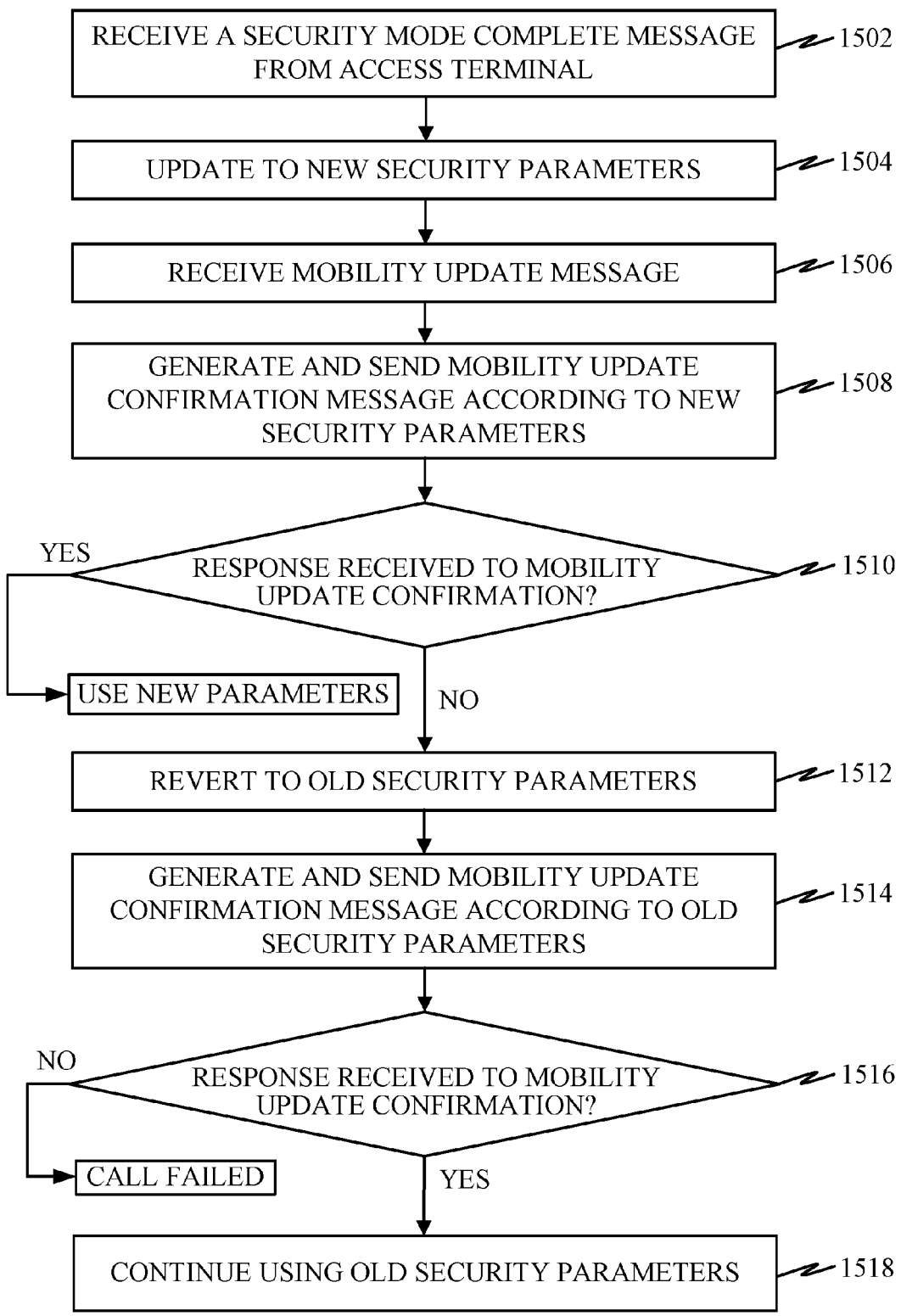
FIG. 15 is a flow diagram illustrating an example of a method operational in a network entity for determining that an access terminal has reverted to old security parameters.

FIG. 15 is a flow diagram illustrating an example of a method operational in a network entity, such as network entity 1300, for determining that an access terminal has reverted to old security parameters. Referring to both of FIGS. 13 and 15, a network entity 1300 may receive a security mode complete message from an access terminal at step 1502. For example, the processing circuit 1302 may receive a security mode complete message via the communications interface 1306.

In response to the security mode complete message received from the access terminal, the network entity 1300 may update to new security parameters for communications between the network entity 1300 and the access terminal at step 1504. In at least one implementation, the processing circuit 1302 can be adapted to update the security parameters associated with the access terminal to new security parameters in response to receiving the security mode complete message. The processing circuit 1302 can be adapted to retain the old security parameters for a specified period of time after updating to the new security parameters. For example, the processing circuit 1302 may store the old security parameters in the storage medium 1304 for a period of time (e.g., until a communication is received from the access terminal employing the new security parameters).

At step 1506, the network entity 1300 may receive a mobility update message from the access terminal. For example, the processing circuit 1302 may receive the mobility update message via the communications interface 1306. The mobility update message may be received as a radio resource control (RRC) message. According to at least one implementation, the mobility update message is not ciphered, and can be read by the processing circuit 1302 without decoding the message first.

In response to the received mobility update message, the network entity 1300 generates and sends a mobility update confirmation message at step 1508. For example, the processing circuit 1302 can generate a mobility update confirmation message and may cipher the message according to the new security parameters. The processing circuit 1302 can then send the ciphered mobility update confirmation message via the communications interface 1306 to the access terminal.

At step 1510, the network entity 1300 determines whether a response to the mobility update confirmation message has been received from the access terminal. For example, the processing circuit 1302 may monitor communications received via the communications interface 1306 for a response to the mobility update confirmation message. In at least some implementations, the security parameters revert and/or update operations 1310 may cause the security parameters revert and/or update module 1308 to monitor for the received response. If a response is received, the processing circuit 1302 can continue using the new security parameters.

If no response is received, then the security parameters revert and/or update module 1308 may revert back to the old security parameters at step 1512 to determine whether the access terminal is employing the old security parameters. In some implementations, the processing circuit 1302 (e.g., the security parameters revert and/or update operations 1310) may be adapted to resend the mobility update confirmation message after a failure to receive a response, and await another response to the resent mobility update confirmation message. If no response is received after a predetermined number of times sending the mobility update confirmation message, the processing circuit 1302 (e.g., the security parameters revert and/or update operations 1310) may be adapted to revert back to the old security parameters to determine whether the access terminal is employing the old security parameters.

Employing the old security parameters, the network entity 1300 generates and sends another mobility update confirmation message at step 1514. In some implementations, the processing circuit 1302 can generate a mobility update confirmation message and may cipher the message. Unlike the previous mobility update confirmation messages ciphered according to the new security parameters, this mobility update confirmation message is ciphered according to the old security parameters. The processing circuit 1302 can then send the ciphered mobility update confirmation message via the communications interface 1306 to the access terminal.

At step 1516, the network entity 1300 determines whether a response to the mobility update confirmation message ciphered according to the old security parameters has been received from the access terminal. For example, the processing circuit 1302 may monitor communications received via the communications interface 1306 for a response to the mobility update confirmation message. If a response is received to the mobility update confirmation message ciphered according to the old security parameters, the security parameters revert and/or update module 1308 may determine that the access terminal has reverted back to the old security parameters, and can cause the network entity 1300 to continue using the old security parameters at step 1518. If no response is received to the mobility update confirmation message ciphered according to the old security parameters, the processing circuit 1302 may cause the call to fail with the access terminal.

Figure 16:
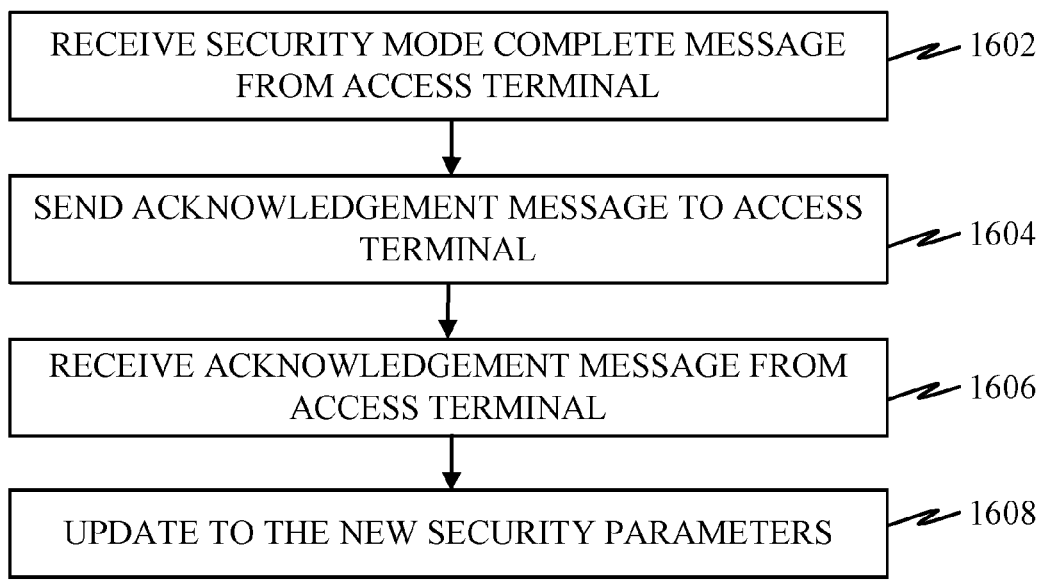
FIG. 16 is a flow diagram illustrating an example of a method operational in a network entity for updating from old security parameters to new security parameters after the access terminal has updated to the new security parameters.

FIG. 16 is a flow diagram illustrating an example of a method operational in a network entity, such as network entity 1300, for updating from old security parameters to new security parameters after the access terminal has updated to the new security parameters. Referring to both of FIGS. 13 and 16, a network entity 1300 may receive a security mode complete message from an access terminal at step 1602. For example, the processing circuit 1302 may receive a security mode complete message via the communications interface 1306.

In response to the security mode complete message, the network entity 1300 sends an acknowledgement message to the access terminal at step 1604. The acknowledgement message may comprise an L2 transmission adapted to indicate to the access terminal that the security mode complete message was successfully received and verified by the network entity. According to at least one implementation, the processing circuit 1302 may generate and send the acknowledgement message to the access terminal via the communications interface 1306.

At step 1606, the network entity 1300 receives an acknowledgement message from the access terminal. The received acknowledgement message may comprise an L3 acknowledgement message adapted to indicate that the access terminal has successfully updated to the new security parameters. In at least one implementation, the processing circuit 1302 (e.g., the security parameters revert and/or update module 1308) may receive the L3 acknowledgement message via the communications interface 1306.

In response to receiving the acknowledgement message from the access terminal, the network entity 1300 can update to the new security parameters for communications between the network entity 1300 and the access terminal at step 1608. For example, the processing circuit 1302 (e.g., the security parameters revert and/or update module 1308) may update the security parameters associated with the access terminal to the new security parameters in response to receiving the acknowledgement message adapted to indicate that the access terminal has updated to the new security parameters. The processing circuit 1302 can then employ the new security parameters for subsequent communications with the access terminal.

One or more of the components, steps, features and/or functions illustrated in FIGS. 1, 2, 3, 4, 5, 6, 7, 8, 9, 10, 11, 12, 13, 14, 15 and/or 16 may be rearranged and/or combined into a single component, step, feature or function or embodied in several components, steps, or functions. Additional elements, components, steps, and/or functions may also be added without departing from the present disclosure. The apparatus, devices, and/or components illustrated in FIGS. 1, 4, 9 and/or 13 may be configured to perform one or more of the methods, features, or steps described with reference to FIGS. 2, 3, 5, 6, 7, 8, 10, 11, 12, 14, 15, and/or 16. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the disclosure. As such, the present teachings can be readily applied to other types of apparatuses and many alternatives, modifications, and variations will be apparent to those skilled in the art.

What is claimed is:

1. An access terminal, comprising:
a wireless communications interface adapted to facilitate wireless communications; and
a processing circuit coupled to the wireless communications interface, the processing circuit adapted to:
conduct a security mode procedure for reconfiguring security parameters of the access terminal;
send a security mode complete message to an access network via the wireless communications interface as part of the security mode procedure;
send a mobility update message via the wireless communications interface as part of a mobility procedure, wherein the mobility update message is sent prior to reception of an acknowledgement message for the sent security mode complete message;
receive a mobility update confirmation message from the access network; and
switch the security parameters to decode the mobility update confirmation message after one or more failed attempts to decode the mobility update confirmation message.

2. The access terminal of claim 1, wherein the security mode procedure comprises an Access Stratum security mode procedure for reconfiguring Access Stratum security parameters of the access terminal.

3. The access terminal of claim 2, wherein the processing circuit is adapted to conduct the Access Stratum security mode procedure using a radio resource control (RRC) layer of a protocol stack.

4. The access terminal of claim 1, wherein the mobility procedure comprises a cell update procedure.

5. The access terminal of claim 1, wherein the mobility update message comprises one of a cell reselection message, a radio link control (RLC) unrecoverable error message, or an out of service message.

6. The access terminal of claim 1, wherein the processing circuit is adapted to abort an initial security mode procedure and revert back to an initial set of security parameters when an initial acknowledgement message is not received from the access network for the initial security mode procedure before the mobility procedure is initiated for the initial security mode procedure.

7. A method operational on an access terminal, comprising:
conducting a security mode procedure for reconfiguring security parameters of the access terminal;
sending a security mode complete message to an access network as part of the security mode procedure;
sending a mobility update message as part of a mobility procedure, wherein the mobility update message is sent prior to reception of an acknowledgement message for the sent security mode complete message;
receiving a mobility update confirmation message from the access network; and
switching the security parameters to decode the mobility update confirmation message after one or more failed attempts to decode the mobility update confirmation message.

8. The method of claim 7, wherein conducting the security mode procedure comprises:
conducting an Access Stratum security mode procedure for reconfiguring Access Stratum security parameters of the access terminal.

9. The method of claim 8, wherein conducting the Access Stratum security mode procedure comprises:
conducting the Access Stratum security mode procedure using a radio resource control (RRC) layer of a protocol stack.

10. The method of claim 7, wherein:
the mobility procedure comprises a cell update procedure; and the mobility update message comprises a cell update message.

11. The method of claim 7, wherein the mobility update message comprises one of a cell reselection message, a radio link control (RLC) unrecoverable error message, or an out of service message.

12. The method of claim 7, further comprising:
aborting an initial security mode procedure and reverting back to an initial set of security parameters when an initial acknowledgement message is not received from the access network for the initial security mode procedure before the mobility procedure is initiated for the initial security mode procedure.

13. An access terminal, comprising:
means for conducting a security mode procedure for reconfiguring first security parameters of the access terminal;
means for sending a security mode complete message to an access network as part of the security mode procedure;
means for sending a mobility update message as part of a mobility procedure, wherein the mobility update message is sent prior to reception of an acknowledgement message for the sent security mode complete message;
means for receiving a mobility update confirmation message from the access network; and
means for switching the security parameters to decode the mobility update confirmation message after one or more failed attempts to decode the mobility update confirmation message.

14. A non-transitory processor-readable medium comprising instructions operational on an access terminal, which when executed by a processor causes the processor to:
conduct a security mode procedure for reconfiguring security parameters of the access terminal;
send a security mode complete message to an access network as part of the security mode procedure;
send a mobility update message as part of a mobility procedure, wherein the mobility update message is sent prior to reception of an acknowledgement message for the sent security mode complete message;
receive a mobility update confirmation message from the access network; and
switch the security parameters to decode the mobility update confirmation message after one or more failed attempts to decode the mobility update confirmation message.

15. The access terminal of claim 1, wherein the security mode procedure is adapted to reconfigure first security parameters to second security parameters and wherein each of the first and second security parameters comprises a plurality of security keys associated with different layers of a network protocol stack.

16. The access terminal of claim 15, wherein the plurality of security keys are derived from a root key for the different layers.

17. The access terminal of claim 1, wherein the security mode complete message comprises a message authentication code for integrity (MAC-I).

18. The access terminal of claim 1, wherein the mobility update message comprises a radio resource control (RRC) message.

19. The access terminal of claim 1, wherein the mobility update confirmation message received from the access network is ciphered according to the second security parameters.

20. The method of claim 7, wherein the security mode procedure reconfigures first security parameters to second security parameters and wherein each of the first and second security parameters comprises a plurality of security keys associated with different layers of a network protocol stack.

21. The method of claim 20, wherein the plurality of security keys are derived from a root key for the different layers.

22. The method of claim 7, wherein the security mode complete message comprises a message authentication code for integrity (MAC-I).

23. The method of claim 7, wherein the mobility update message comprises a radio resource control (RRC) message.

24. The method of claim 7, wherein the mobility update confirmation message received from the access network is ciphered according to the second security parameters.

25. An access terminal, comprising:
a wireless communications interface adapted to facilitate wireless communications; and
a processing circuit coupled to the wireless communications interface, the processing circuit adapted to:
 conduct a security mode procedure for reconfiguring first security parameters of the access terminal to second security parameters;
 send a security mode complete message to an access network via the wireless communications interface as part of the security mode procedure;
 send a mobility update message via the wireless communications interface as part of a mobility procedure, wherein the mobility update message is sent prior to reception of an acknowledgement message for the sent security mode complete message;
 receive a mobility update confirmation message from the access network, the mobility update confirmation message being ciphered according to the second security parameters; and
 switch from the first security parameters to the second security parameters to decode the mobility update confirmation message after one or more failed attempts to decode the mobility update confirmation message ciphered according to the second security parameters.

26. A method operational on an access terminal, comprising:
conducting a security mode procedure for reconfiguring first security parameters of the access terminal to second security parameters;
sending a security mode complete message to an access network as part of the security mode procedure;
sending a mobility update message as part of a mobility procedure, wherein the mobility update message is sent prior to reception of an acknowledgement message for the sent security mode complete message;
receiving a mobility update confirmation message from the access network, the mobility update confirmation message being ciphered according to the second security parameters; and
switching from the first security parameters to the second security parameters to decode the mobility update confirmation message after one or more failed attempts to decode the mobility update confirmation message ciphered according to the second security parameters.

* * * * *